(12) United States Patent
Stack

(10) Patent No.: US 10,702,061 B2
(45) Date of Patent: Jul. 7, 2020

(54) MODULAR CABINET WITH HIDDEN CLAMPING SYSTEM

(71) Applicant: Richard Stack, Jupiter, FL (US)

(72) Inventor: Richard Stack, Jupiter, FL (US)

( * ) Notice: Subject to any disclaimer, the term of this patent is extended or adjusted under 35 U.S.C. 154(b) by 0 days.

(21) Appl. No.: 15/971,533

(22) Filed: May 4, 2018

(65) Prior Publication Data

US 2018/0249828 A1   Sep. 6, 2018

Related U.S. Application Data

(63) Continuation of application No. 15/160,463, filed on May 20, 2016, now Pat. No. 10,136,726.

(60) Provisional application No. 62/164,340, filed on May 20, 2015.

(51) Int. Cl.
| | | |
|---|---|---|
| *F16B 12/10* | (2006.01) | |
| *A47B 47/00* | (2006.01) | |
| *A47B 47/04* | (2006.01) | |
| *F16B 12/20* | (2006.01) | |
| *F16B 12/24* | (2006.01) | |
| *A47B 77/00* | (2006.01) | |
| *F16B 5/00* | (2006.01) | |
| *A47B 91/02* | (2006.01) | |
| *A47B 96/06* | (2006.01) | |
| *F16B 5/06* | (2006.01) | |

(52) U.S. Cl.
CPC ........ *A47B 47/0091* (2013.01); *A47B 47/042* (2013.01); *A47B 77/00* (2013.01); *F16B 5/0088* (2013.01); *F16B 12/20* (2013.01); *F16B 12/24* (2013.01); *A47B 91/022* (2013.01); *A47B 96/066* (2013.01); *F16B 5/0052* (2013.01); *F16B 5/0614* (2013.01)

(58) Field of Classification Search
CPC ...... F16B 5/0052; F16B 5/0088; F16B 12/26; F16B 12/20; F16B 12/24; A47B 47/0091; A47B 96/066; A47B 77/00; A47B 47/042
See application file for complete search history.

(56) References Cited

U.S. PATENT DOCUMENTS

| | | | |
|---|---|---|---|
| 376,881 A | 1/1888 | Haish | |
| 1,537,678 A | 5/1925 | Jensen | |
| 1,936,733 A | 11/1933 | Richardson | |
| 2,225,612 A * | 12/1940 | Allen | E04F 15/04 52/586.2 |

(Continued)

FOREIGN PATENT DOCUMENTS

| | | |
|---|---|---|
| DE | 1914089 | 10/1970 |
| DE | 202006004125 | 6/2006 |

(Continued)

*Primary Examiner* — Matthew R McMahon
(74) *Attorney, Agent, or Firm* — McHale & Slavin, P.A.

(57) ABSTRACT

The present invention includes a system for quickly and simply manufacturing semi-custom cabinetry utilizing a hidden pin joining system. The hidden pin joining system allows panels of a cabinet, or other items, to quickly and securely join together, with significant load bearing ability. The joining pin designs allow for discretely joining pieces together to create custom cabinetry during installation. The specially designed drill bits allow the system to work seamlessly. Using CAD/CAM machinery, the drill bits can cut stock pieces that can be taken to installation sites, and formed into custom cabinetry for kitchen, closets, or any other desired shelving units.

6 Claims, 34 Drawing Sheets

(56) References Cited

U.S. PATENT DOCUMENTS

| | | | |
|---|---|---|---|
| 2,735,146 A | 2/1956 | Purviance | |
| 3,261,493 A | 7/1966 | Smith | |
| 3,857,619 A | 12/1974 | Adickes | |
| 3,883,258 A * | 5/1975 | Hewson | F16B 12/24 403/292 |
| 4,025,216 A * | 5/1977 | Hives | F16B 12/26 403/381 |
| 4,032,241 A | 6/1977 | Martin | |
| 4,189,861 A * | 2/1980 | Fischer | A63H 33/102 446/127 |
| 4,383,397 A | 5/1983 | Ward | |
| 4,645,374 A | 2/1987 | Erickson et al. | |
| 4,701,066 A * | 10/1987 | Beam | A47B 96/20 403/298 |
| 4,795,116 A * | 1/1989 | Kohut | F16B 21/086 24/16 PB |
| D309,985 S | 8/1990 | Cox | |
| 5,360,128 A | 11/1994 | Hessenthaler | |
| 5,676,486 A | 10/1997 | Keith | |
| 5,704,699 A | 1/1998 | Pagelow et al. | |
| 5,934,486 A * | 8/1999 | Jarvis | A47B 81/04 211/126.12 |
| 6,186,698 B1 * | 2/2001 | Knapp | F16B 5/002 403/326 |
| 7,178,886 B2 * | 2/2007 | Hightower | A47B 96/00 312/204 |
| 7,207,636 B2 | 4/2007 | Livingston et al. | |
| 7,444,792 B2 * | 11/2008 | Matson | E04D 12/00 24/336 |
| 8,147,162 B1 | 4/2012 | Burnett et al. | |
| 8,206,054 B1 | 6/2012 | Burnett et al. | |
| 8,641,315 B2 * | 2/2014 | Liu | A47B 95/00 403/297 |
| 9,377,042 B2 * | 6/2016 | De Wilde | A63H 33/101 |
| 9,644,653 B2 * | 5/2017 | Reiter | F16B 5/0016 |
| 9,714,673 B2 * | 7/2017 | Phillips | F16B 12/24 |
| 9,810,253 B2 * | 11/2017 | Koelling | F16B 12/24 |
| 10,138,917 B2 * | 11/2018 | Koch | F16B 5/0052 |
| 10,197,081 B2 * | 2/2019 | Koelling | F16B 12/125 |
| 2004/0155562 A1 * | 8/2004 | Saravis | A47B 47/0033 312/111 |
| 2004/0195122 A1 * | 10/2004 | Awaji | A47B 13/021 206/278 |

FOREIGN PATENT DOCUMENTS

| | | | |
|---|---|---|---|
| DE | 102011014152 A1 * | 9/2012 | F16B 12/24 |
| DE | 202014100089 U1 * | 4/2015 | F16B 5/0642 |
| EP | 3078864 A1 * | 10/2016 | F16B 12/26 |
| FR | 438441 | 5/1912 | |
| FR | 2590943 | 6/1987 | |
| GB | 2064699 | 6/1981 | |

* cited by examiner

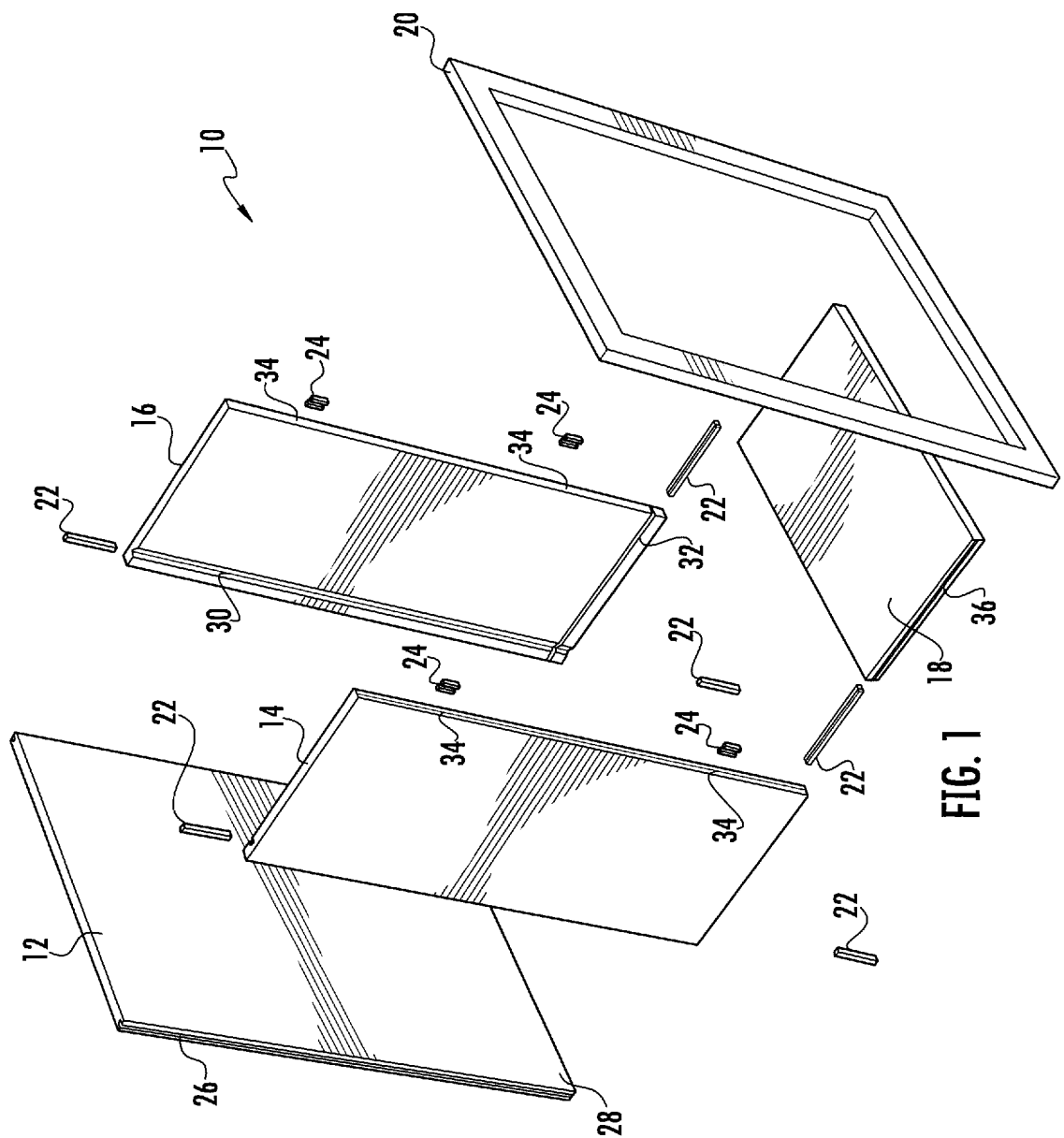

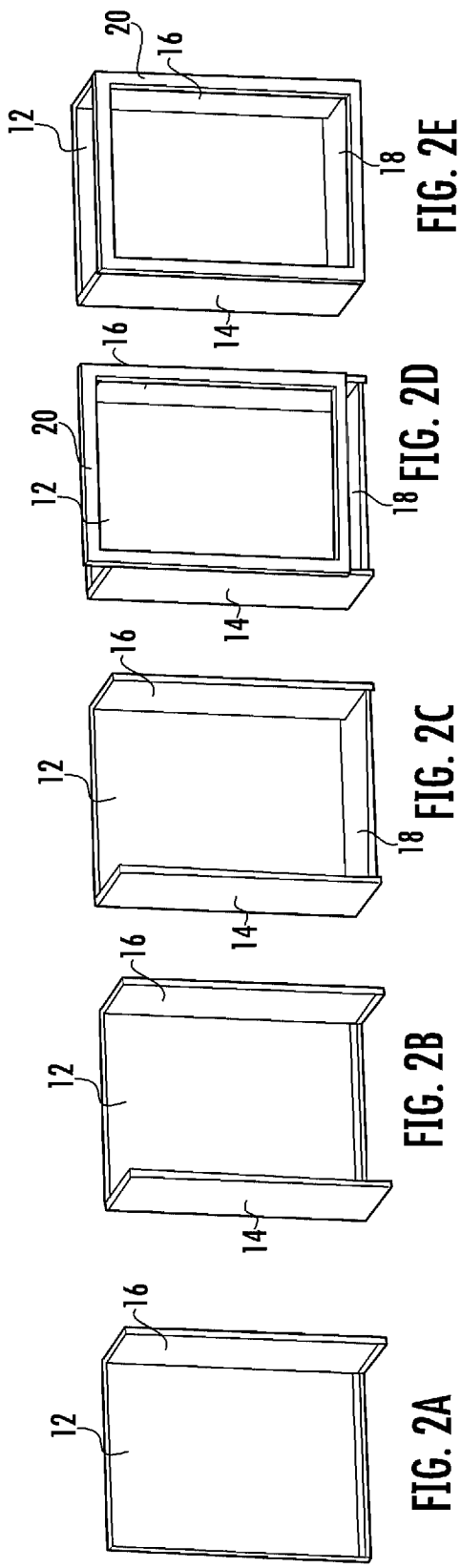

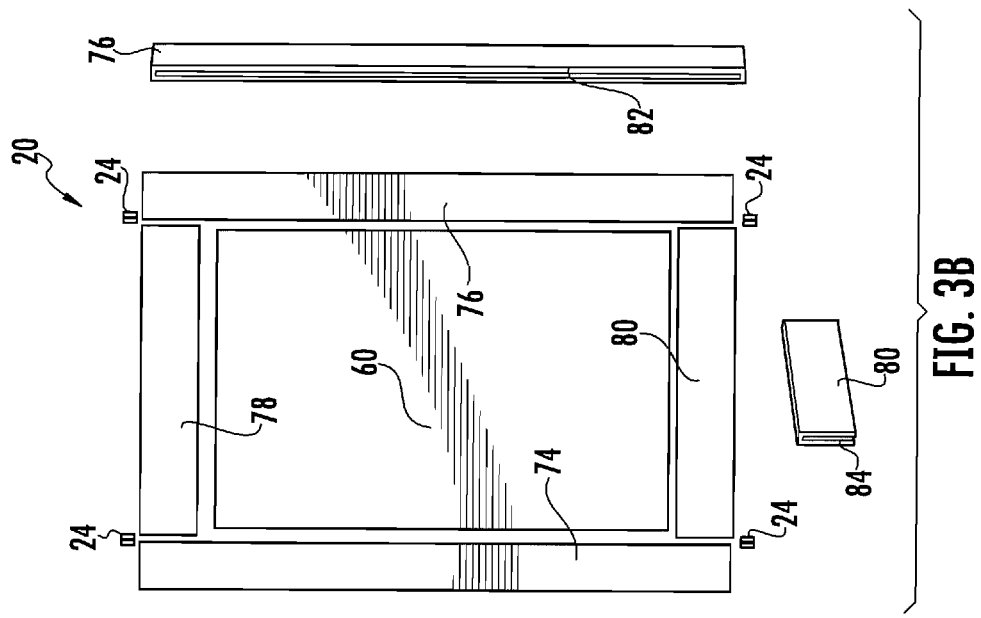
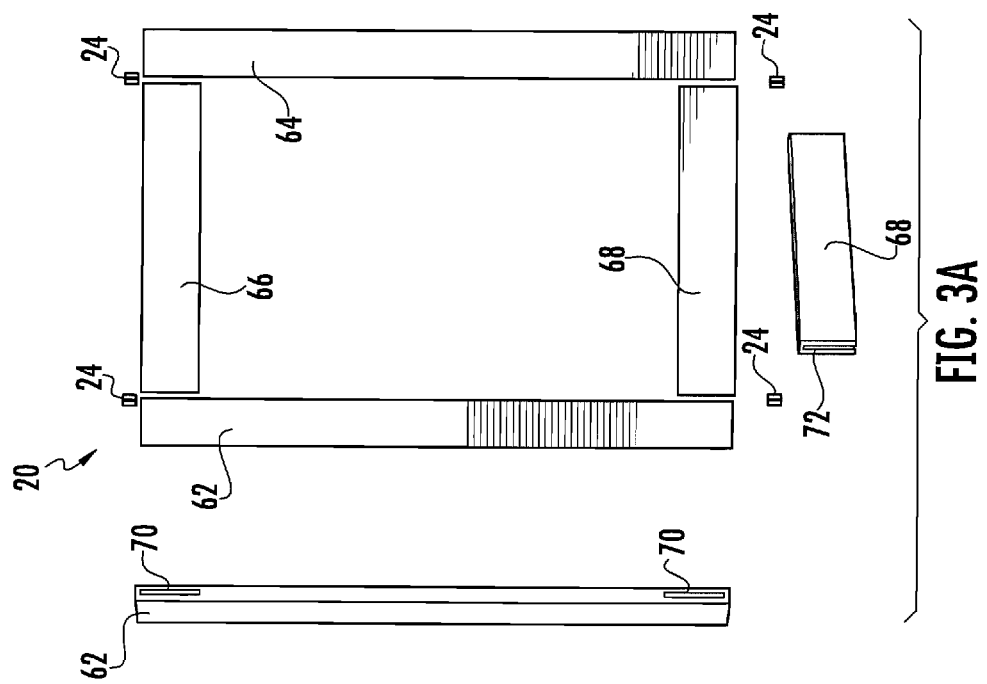

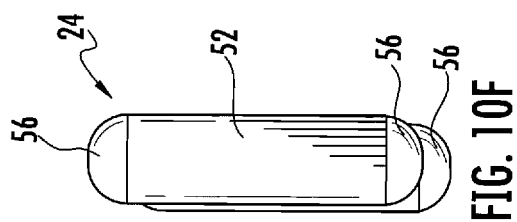
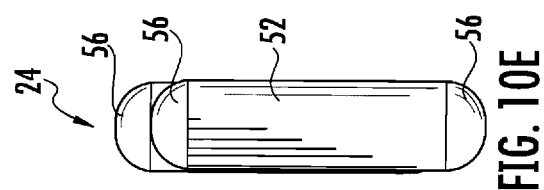
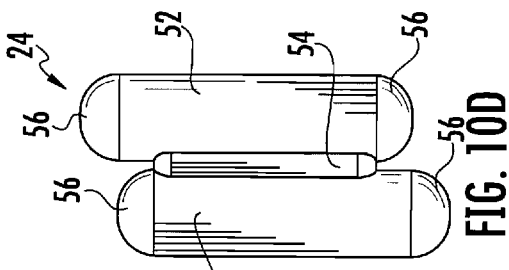
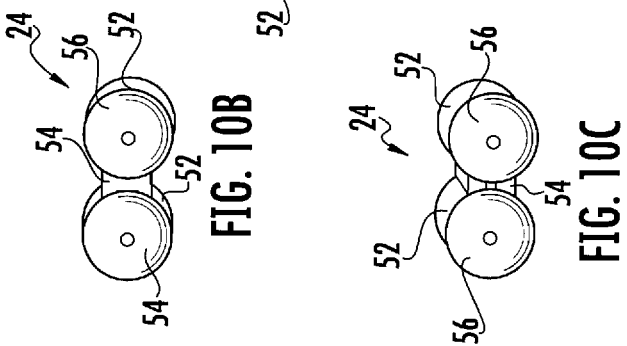
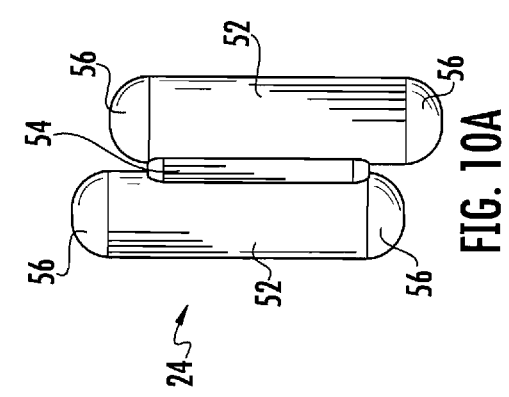

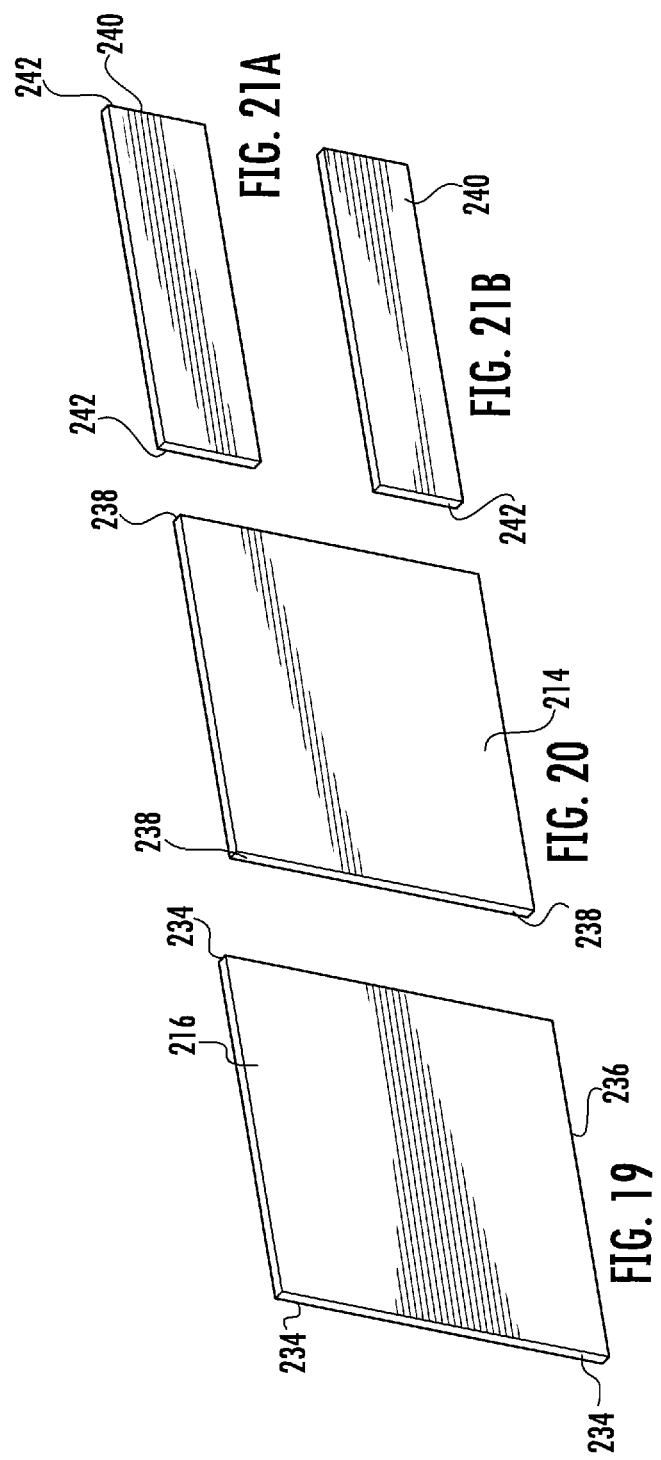

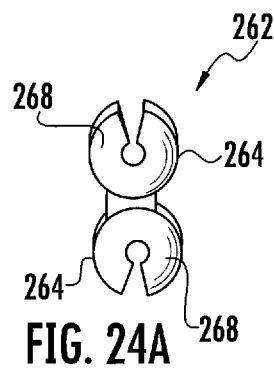
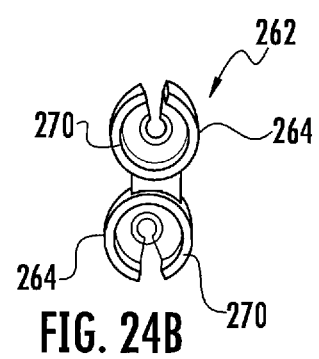
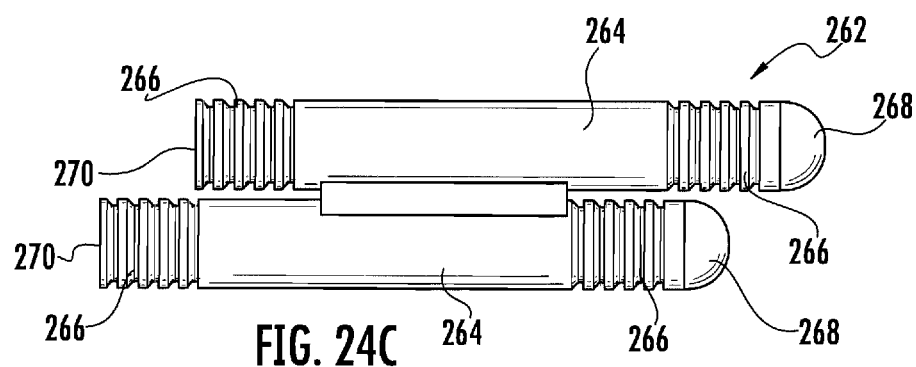
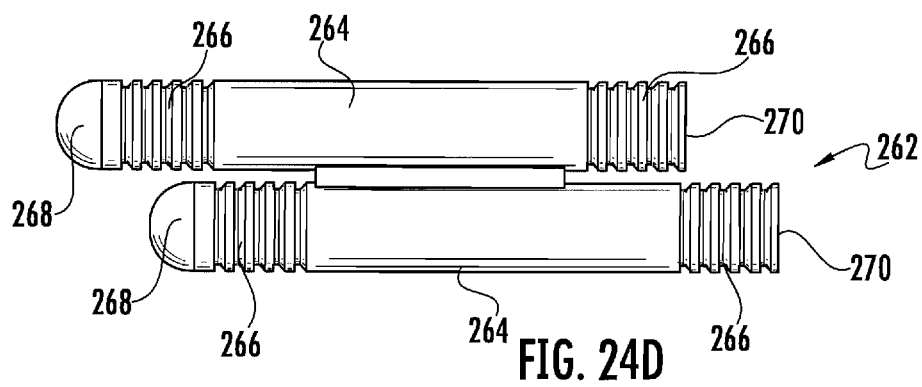

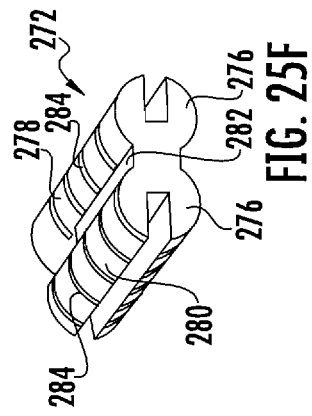
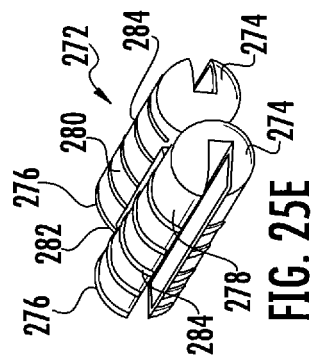
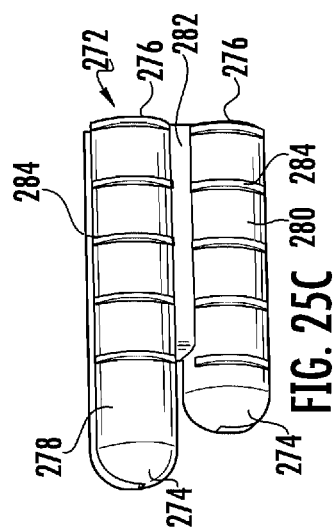
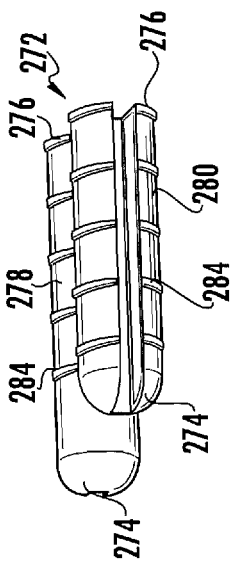
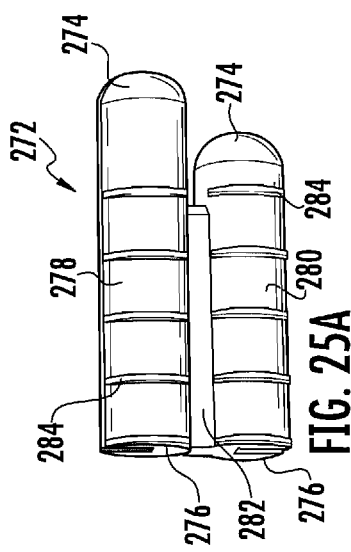
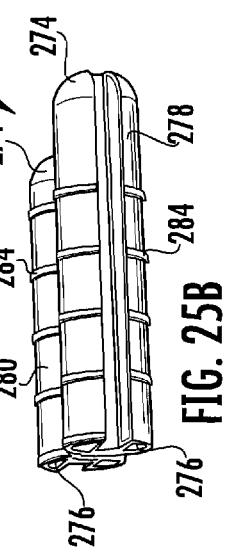

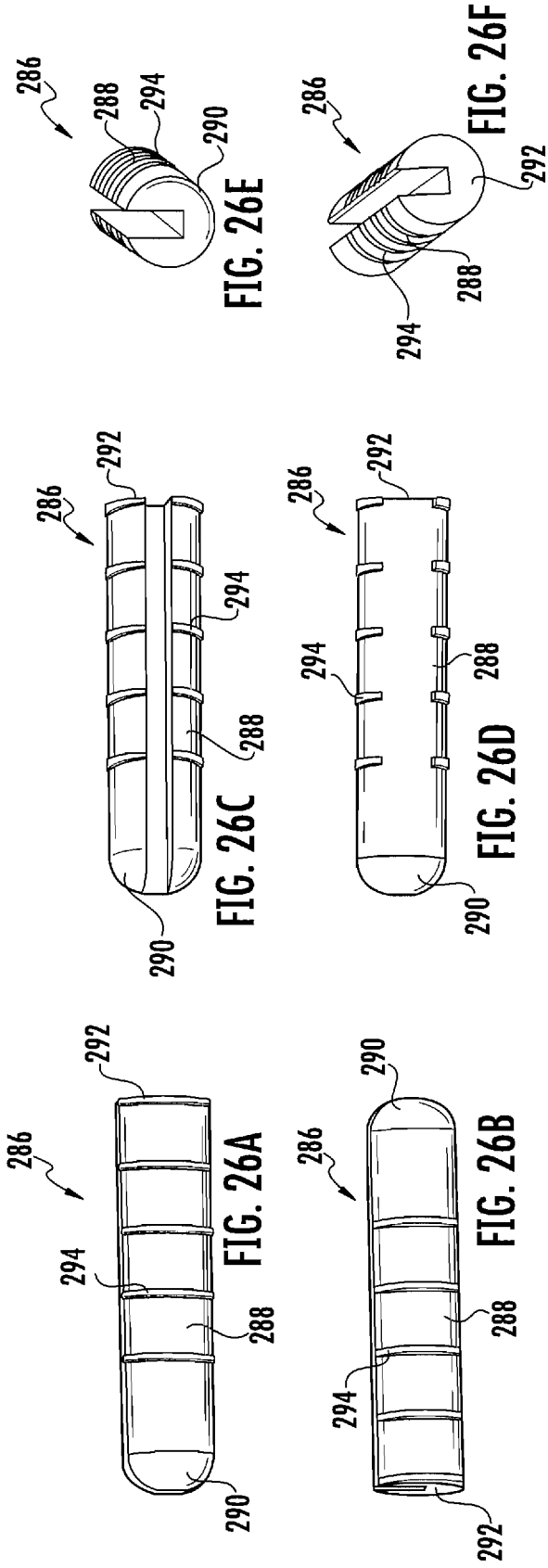

MODULAR CABINET WITH HIDDEN CLAMPING SYSTEM

PRIORITY CLAIM

In accordance with 37 C.F.R. 1.76, a claim of priority is included in an Application Data Sheet filed concurrently herewith. Accordingly, under 35 U.S.C. §§ 119(e), 120, 121, and/or 365(c), the present invention claims priority as a continuation of U.S. patent application Ser. No. 15/160,463 entitled "MODULAR CABINET WITH HIDDEN CLAMPING SYSTEM", filed May 20, 2016, which claims priority to U.S. Provisional Patent Application No. 62/164,340, entitled "MODULAR CABINET WITH HIDDEN CLAMPING SYSTEM", filed May 20, 2015. The contents of the above referenced applications are incorporated herein by reference in their entirety.

FIELD OF THE INVENTION

The present invention relates to the field of cabinetry, and more particularly for a system for modular cabinets and couplings that can be used in homes to construct cabinets and cabinet systems.

BACKGROUND OF THE INVENTION

Whether remodeling a home, or just a room in a home, one of the best ways to boost the overall appeal of the home, in terms of both aesthetic appeal and home value, is with new cabinetry. In terms of home remodeling, kitchen remodeling is one of the main ways that homes are updated, and the cornerstone of a kitchen remodel is the kitchen cabinetry. Research indicates that a well-done kitchen remodel significantly increases the value of a home. Cabinetry, or the shelving system used to set the framework for the cabinets, can be incorporated in many ways to provide elegant upgrades to a home, make the home more aesthetically pleasing, and functionally improve the home.

Cabinets are preferably meant to be custom made, fitting the needs of the kitchen, or other room, and the people using the space. But custom cabinetry can be prohibitively expensive because of the time and expense required to design, manufacture, and install the custom pieces. Alternatively, homeowners can install pre-fabricated, stock, systems, which are more cost effective, but lack the desirability of custom cabinetry.

DESCRIPTION OF THE PRIOR ART

U.S. Pat. No. 2,735,146 discloses a building block construction for use by children in building toy structures such as houses, walls, or the like. Grooves are provided in each end of the building blocks, which register when blocks are placed together in the formation of a toy building structures. The grooves are constructed to receive keys to secure the blocks together.

U.S. Pat. No. 3,857,619 discloses a modular cabinet system having a basic unit that may be adapted to a number of different designs. The bottom, back and ends of the modular cabinet system is molded as a single portion of the unit with the top and end covers being bonded thereon to form the basic unit. The back of the modular cabinet system has ribs or channels that may be used to support a center shelf and/or retain drawers and bins within the modular cabinet system, plus provided additional support for wall mounting. Lids that are self sealing fit the drawers or bins. Hinged doors may be mounted on the front of the modular cabinet system to form another use with dispensers contained therein for dispensing such things as paper towels.

U.S. Pat. No. 5,360,128 discloses a wooden jewelry case having sides joined at their ends by miters locked together with brass compression splines having a twibill cross sectional shape. A top and bottom are each attached to the sides with locking splines having a cross sectional shape similar to the figure "8," which locking splines permit the top and bottom to float within the frame provided by the sides and thereby accommodate movement. After assembly of the sides, they are typically cut longitudinally to separate the body of the case from a lid assembly that may be hinged to the body with pin type hinges.

U.S. Pat. No. 5,704,699 discloses a modular easily assembled cabinet system including components in kit form. The kit includes a generally rectangular base, top, side and back members, and four elongated corner post or upright members. The corner post members each define connector ends having transverse recesses adapted to receive tongue portions of connector sites formed on each corner of the base and top members. During assembly, vertical lateral edges of the side members are received within channels in the corner posts, and upper and lower edges are inserted into channels formed in the base and top members. Fasteners releaseably secure the connector side tongues within the corner post recesses. A door may be hinged between the base and top members. The base, top and door may be formed of blow molded plastic, with the base and top members being configured to enable nesting of cabinets in vertically stacked relation. Additional features include slide drawers and shelves releasable mounted on laterally opposed rod-type horizontal guides.

U.S. Pat. No. 7,207,636 discloses a modular cabinet structure, process, and system in which a modular cabinet structure comprises a structural frame comprising a first side and a second side, and a first end and a second end opposite the first end, wherein the frame structure comprises a removable frame component at the second end; and a face assembly; wherein the face assembly is fixedly retained within the frame structure when the removable frame component is affixed to the frame structure; and wherein the face assembly is movable in relation to the frame structure when the removable frame component is detached from the frame structure. In frame-style embodiments, the face assembly comprises a central panel having a front surface and a back surface, a retaining assembly attached to the back surface of the central panel, and a face frame having a front surface and a rear surface attached to the central panel. In full panel-style embodiments, the face assembly typically comprises a full panel having a front surface and a back surface, and a retaining assembly attached to the back surface of the panel. The modular cabinet structures can be used for cabinet doors and/or cabinet drawers, such that the face assemblies are readily installed and/or replaced.

U.S. Pat. No. 8,147,162 discloses a coupling for joining together furniture members that has a center portion including a center portion geometric configuration, a first portion including a first portion geometric configuration, a second portion including a second portion geometric configuration, a first end and a second end.

U.S. Pat. No. 8,206,054 discloses a furniture coupling assembly that includes a coupling having a center portion, a first portion having a first locking member, a second portion having a second locking member, a first end and a second end. The assembly further includes a first furniture member having a first member groove having a shape corresponding to the center, first and second portions of the coupling. The first furniture member has a first locking member opening positioned adjacent to the first member groove. A second furniture member of the assembly has a second member groove having a shape corresponding to the center, first and second portions of the coupling. The second furniture member has a second locking member opening positioned adjacent to the second member groove. The coupling is insertable in the first and second furniture member grooves and the first and second locking members are insertable in the first and second locking member openings, respectively, to join together the first and second furniture members.

What is lacking in the prior art is a system of creating cabinetry with the desired custom look and functionality, which can be created during installation, saving time and cost while providing the aesthetic appeal and value of custom systems.

SUMMARY OF THE INVENTION

The present invention relates to a modular cabinet system incorporating a joining system employing grooves or channels cut into the wood pieces which allow them to fit together, and be held together, by a hidden clamping system. The bottom, opposing side walls, and back wall are machined with grooves or channels so that when positioned together, the grooves or channels line up, allowing a hidden clamp to be placed within, and connecting, each piece to the other by connecting the grooves or channels to each other. Different pieces of the modular system can also be placed in proximity to each other, with grooves or channels lining up, and then joined together by employing hidden clamps to connect them. A front face frame can then be placed over the front of the modular cabinet and joined by lining up the grooves or channels on the inner side of the face frame and the grooves or channels on the front edges of the side walls and joining them with hidden clamps. A top piece can be employed if desired, such as when the cabinet is to be used above a counter.

The grooves or channels are machined into each piece using one of two specially designed drill bit on a computer numeric control (CNC) system, depending on whether it is desired to recess one piece of wood into another when joining. When not recessing the wood, the drill bit has a circular outline, with a rectangular neck section so that when the drill bit cuts, the outline of the cut creates a cylindrical channel, with a smaller rectangular channel where the width of the rectangular channel is less than the diameter of the cylindrical channel. The benefit of this design is that the rectangular channel allows for more material to resist an object placed within the bulbous cylindrical channel from being pulled out, thus making it stronger and more secure.

Alternatively, when recessing one board within another, the second drill bit is employed. The second drill bit has the same circular outline at the time, and a rectangular neck section matching the first drill bit. However, there is a second rectangular section with corresponds to the width of the boards that are being used, roughly one-half inch width. It is the second rectangular section which cuts an area for recessing the joining edge of a second board.

The purpose of the groove or channels is to provide a joining system, where the different boards can be attached together without the use of screws, bolds, nails, etc. A system where the pieces can quickly and cleanly be attached by lining up the pieces and inserting a hidden clamping pin, which inserts within both grooves or channels and thus joins the pieces.

Accordingly, it is an objective of the instant invention to provide a system for assembling a cabinet where the pieces are attached without screws, bolts, nails, brackets, or the like.

It is a further objective of the instant invention to teach a system of using a hidden clamp pin so that the fixed product shows minimal or no signs of the attachments.

It is yet another objective of the instant invention to teach clamp designs which can be used to attach shelving to a cabinet.

It is a still further objective of the invention to teach drill bit designs which can create grooves or channels allowing cabinet pieces to be joined easily and securely, and can form the necessary shapes with only a single pass using a CNC system for increased efficiency of production.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 1 is an exploded view of a modular cabinet with hidden clamping system;

FIG. 2A shows the attachment of a side panel to the back panel of a modular cabinet with hidden clamping system;

FIG. 2B shows the attachment of a second side panel to the system of FIG. 2A;

FIG. 2C shows the attachment of a bottom panel to the system of FIG. 2B;

FIG. 2D shows the initial positioning of the front face frame to the system of FIG. 2C;

FIG. 2E shows the securing of the front face frame to the system of FIG. 2D;

FIG. 3A shows an exploded view of a front face frame without a center panel;

FIG. 3B shows an exploded view of a front face frame with a center panel;

FIG. 10A shows a front view of a hidden pin;
FIG. 10B shows a top view of a hidden pin;
FIG. 10C shows a bottom view of a hidden pin;
FIG. 10D shows a back view of a hidden pin;
FIG. 10E shows a first side view of a hidden pin;
FIG. 10F shows a second side view of a hidden pin.

FIG. 19 is a perspective view of a lower back panel for a modular cabinet with hidden clamping system;
FIG. 20 is a perspective view of an upper back panel for a modular cabinet with hidden clamping system;
FIG. 21A is a perspective view of a spreader for a modular cabinet with hidden clamping system;
FIG. 21B is an alternate perspective view of the spreader of FIG. 21A;
FIG. 24A is a first end view of an offset end pin design;
FIG. 24B is a second end view of an offset end pin design;
FIG. 24C is a first side view of an offset end pin design;
FIG. 24D is a second end view of an offset end pin design;
FIG. 25A is a first side perspective view of an alternate offset end pin;
FIG. 25B is a top perspective view of an alternate offset end pin;
FIG. 25C is a second side perspective view of an alternate offset end pin;
FIG. 25D is a bottom perspective view of an alternate offset end pin;
FIG. 25E is a first end perspective view of an alternate offset end pin;
FIG. 25F is a second end perspective view of an alternate offset end pin;
FIG. 26A is a first side view of a single clamp pin;
FIG. 26B is a second side view of a single clamp pin;
FIG. 26C is a top view of a single clamp pin;
FIG. 26D is a bottom view of a single clamp pin;
FIG. 26E of a first end perspective view of a single clamp pin;
FIG. 26F of a second end perspective view of a single clamp pin.

DETAILED DESCRIPTION OF THE INVENTION

Figure 4:
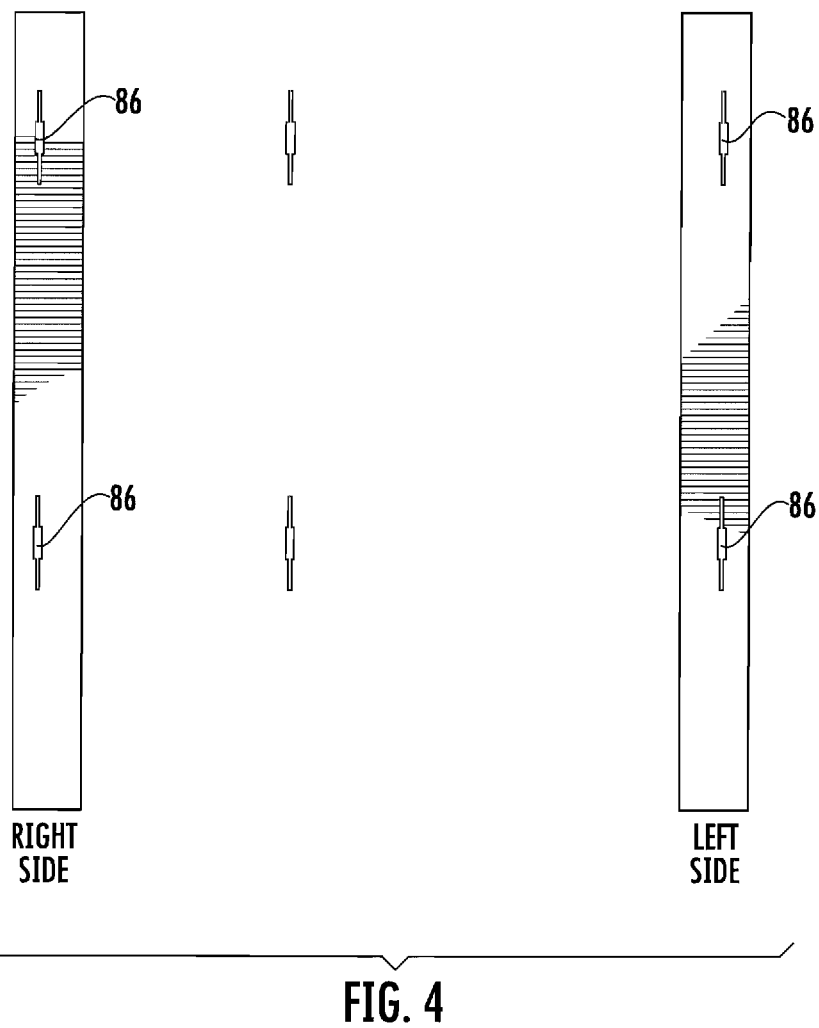
FIG. 4 shows a rear view of the opposing side panels of the front face frame.
Figure 6:
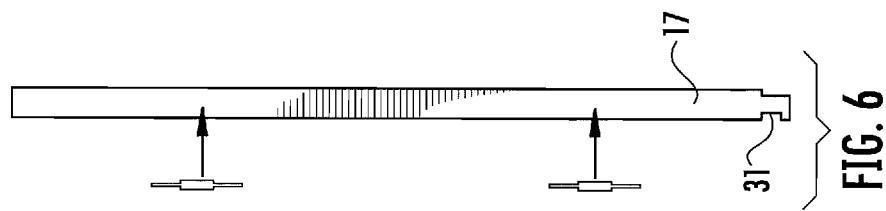
FIG. 6 shows the forward facing edge of a side panel of a modular cabinet with hidden clamping system.
Figure 5:
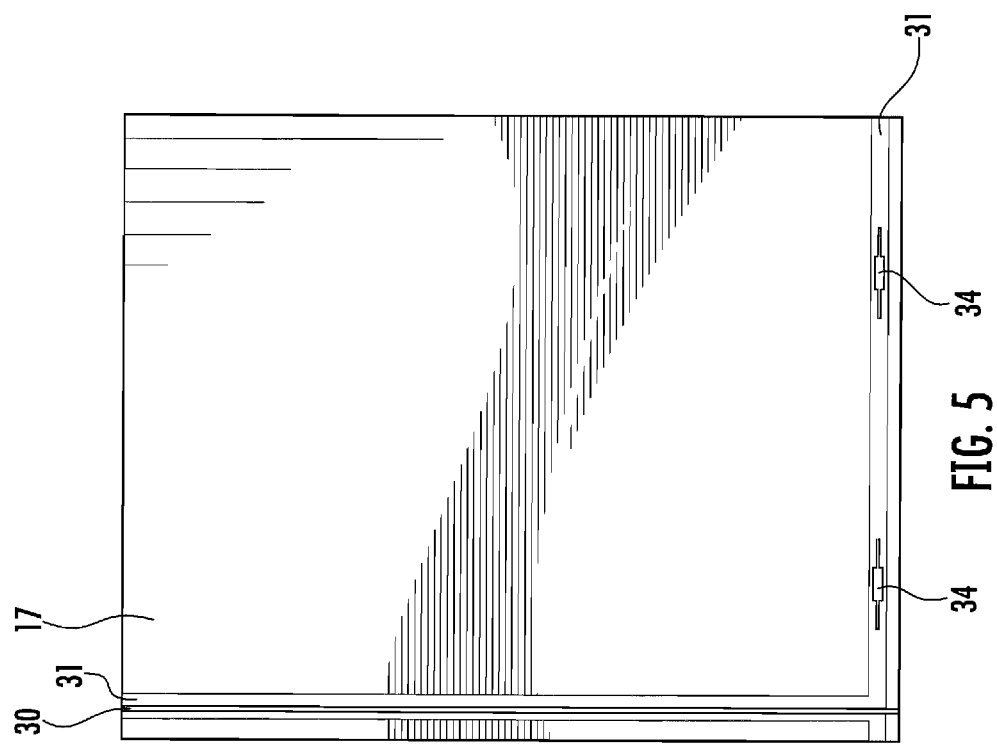
FIG. 5 shows the inner surface of a side panel of a modular cabinet with hidden clamping system.
Figure 7:
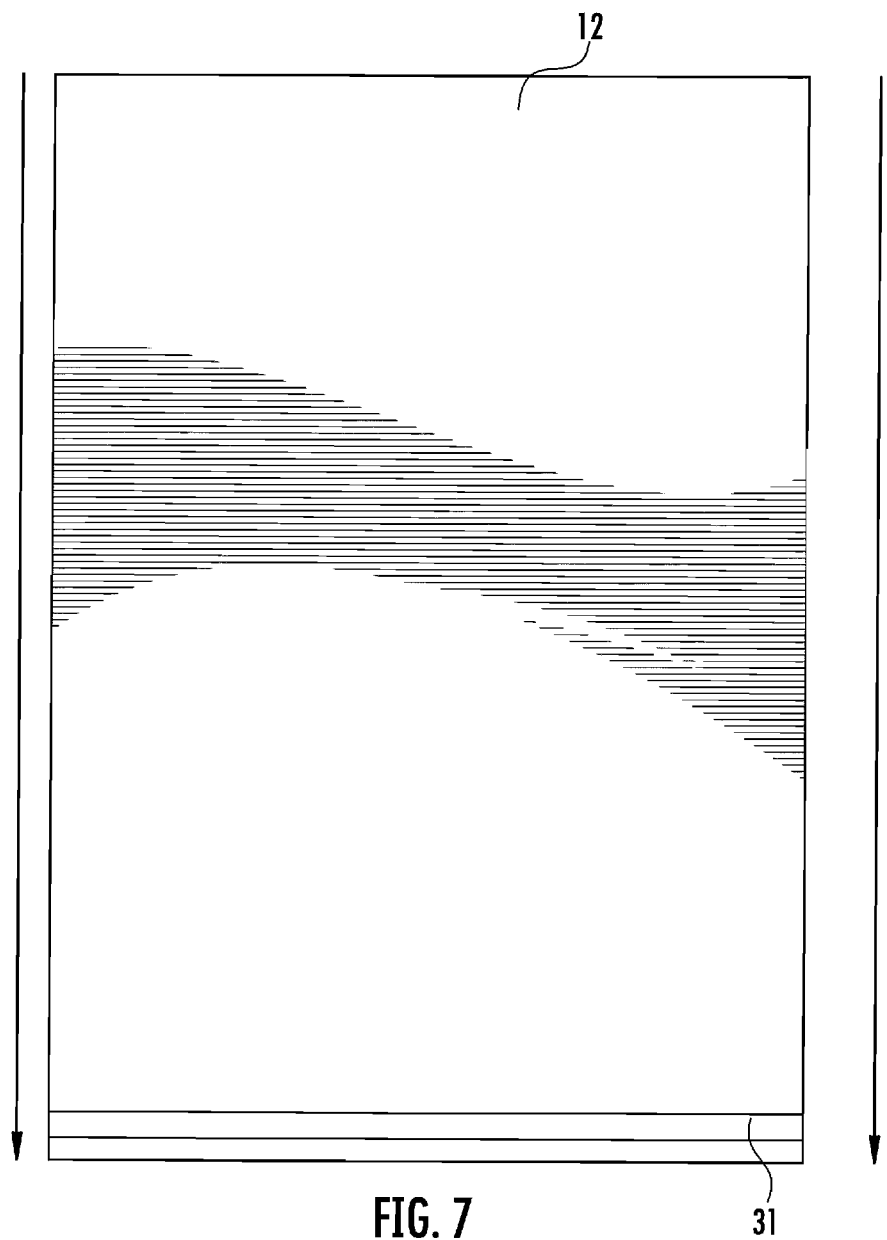
FIG. 7 show a front view of the back panel of a modular cabinet with hidden clamping system.
Figure 8:
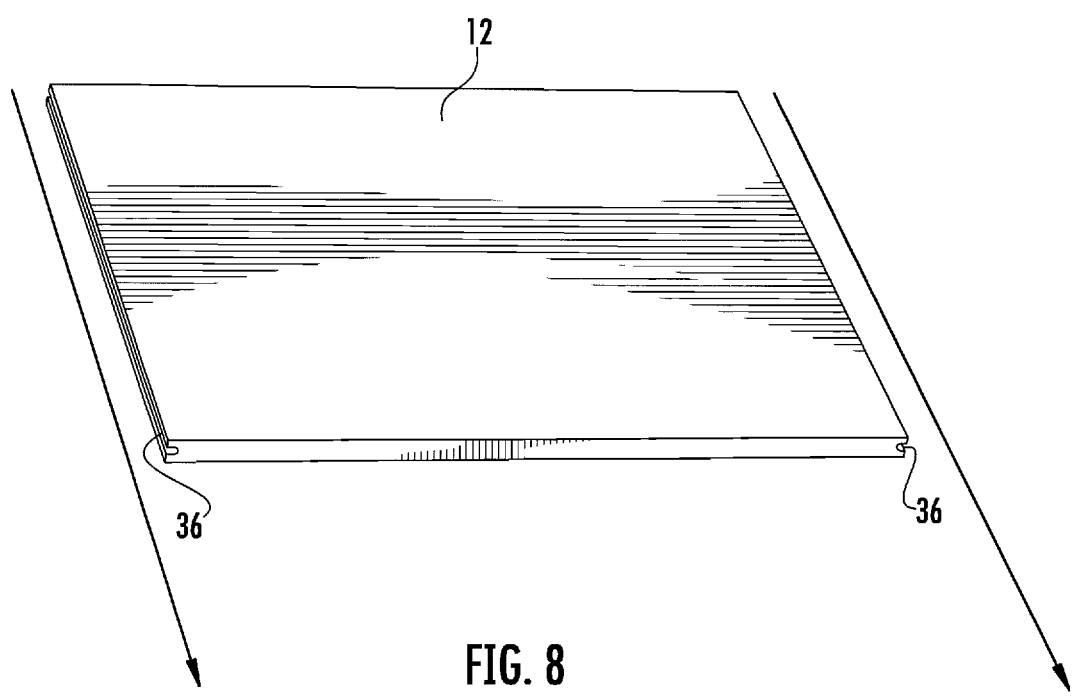
FIG. 8 shows a perspective view of a bottom panel of a modular cabinet with hidden clamping system.
Figure 9A:
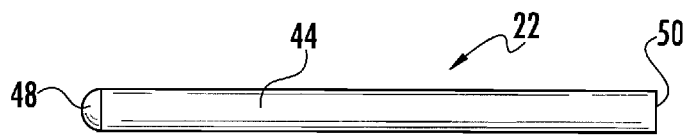
FIG. 9A shows a first side view of an end pin.
Figure 9B:
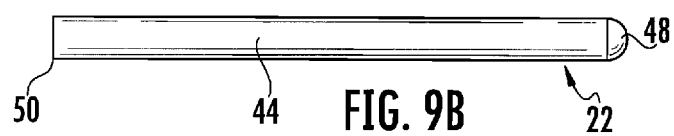
FIG. 9B shows a second side view of an end pin.
Figure 9C:
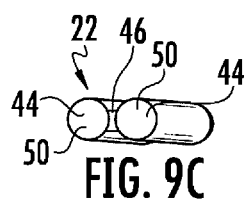
FIG. 9C shows a bottom view of an end pin.
Figure 9D:
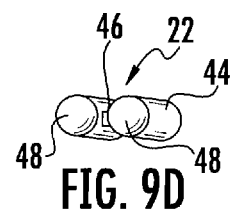
FIG. 9D shows a top view of an end pin.
Figure 9E:
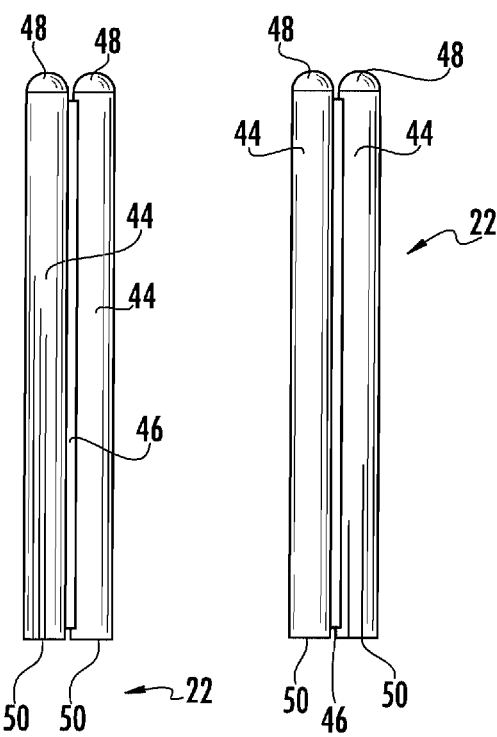
FIG. 9E shows a front view of an end pin.
Figure 9F:
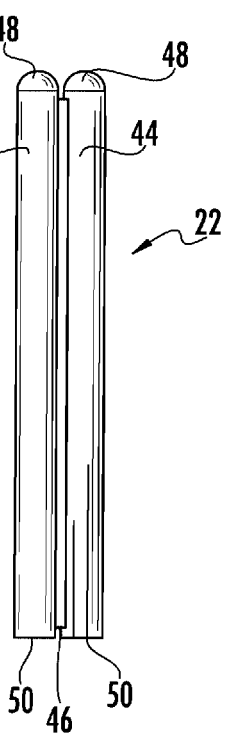
FIG. 9F shows a back view of an end pin.
Figure 9G:
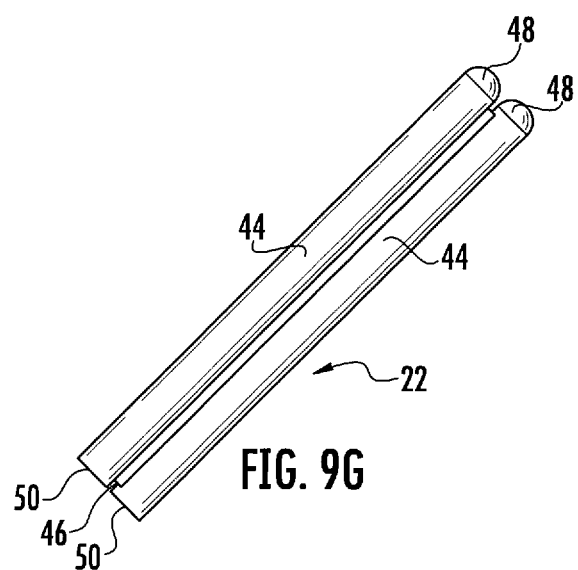
FIG. 9G shows an alternate front view of an end pin.
Figure 11A:
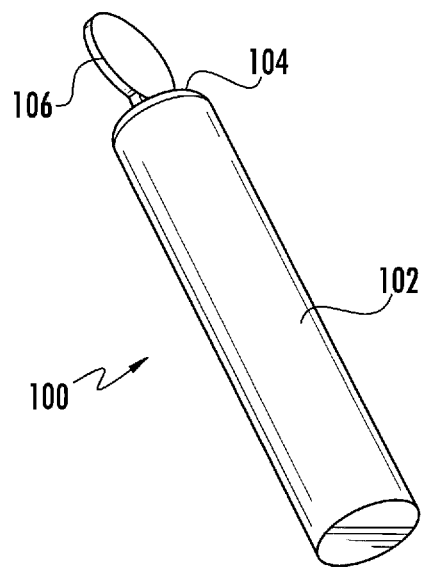
FIG. 11A shows a rear perspective view of a ball bit.
Figure 11B:
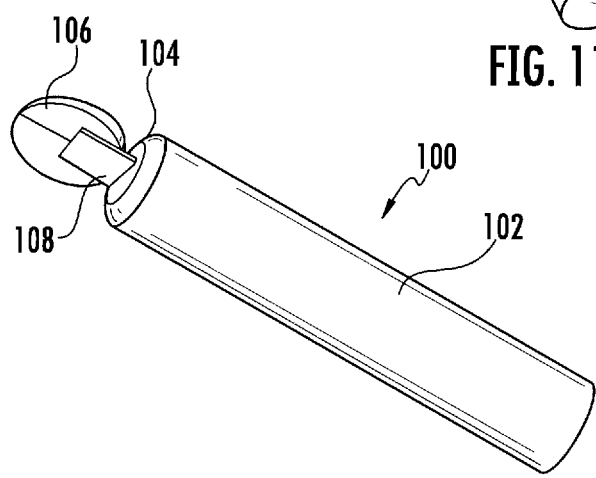
FIG. 11B show a side view of a ball bit.
Figure 11C:
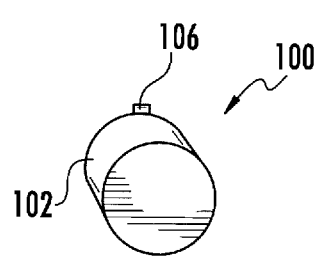
FIG. 11C shows a bottom view of a ball bit.
Figure 11D:
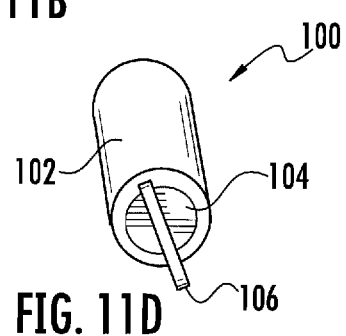
FIG. 11D shows a top view of a ball bit.
Figure 11E:
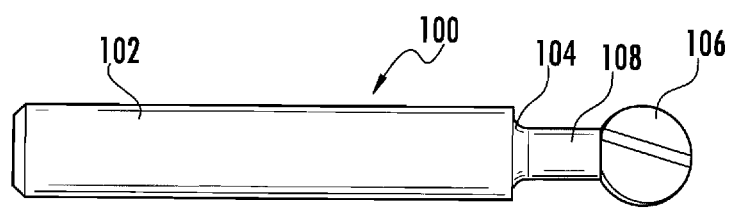
FIG. 11E shows an alternate side view of a ball bit.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Looking to the figures in general, disclosed is a modular cabinet system and the pieces which are used therein, including clamping pins and drill bits. The drill bits are specially formed to cut specific grooves or channels into the boards which make up the cabinet, so that when machining the one bit accomplishes the desired cut without needing to use multiple bits in one area, as is conventionally done.

FIG. 1 illustrates the basic pieces of the modular cabinet with hidden clamping system (10). There is a back panel (12), a first side panel (14), a second side panel (16), a bottom panel (18), and a front face frame (20). The pieces are joined together by placement of an end pin (22), or hidden pin (24) within a groove or channel cut into each piece. Using this system, no additional fasteners are needed to construct the cabinet. Shelving can be added by including pin slots or holes on the inner face of each side wall (14, 16).

As seen in FIG. 1, the back panel has an edge groove or channel (26) on the left and right edge, and a lower groove or channel (28). Each side panel has a vertical groove or channel (30) running the length of the panel on an inner face close to the back edge. Each side panel also has a lower groove or channel (32), and has a pair of hidden grooves or channels (34) on the front edge. The bottom panel has an edge groove or channel (36) on both the left and right edges, and a back edge groove or channel.

The bottom panel (18) can lined up with the back panel (12) so that the back panel lower groove or channel (28) is lined up with the back edge groove or channel of the bottom panel (18). When lined up, an end pin (22) can be inserted on the left and right side connecting the two panels (12, 18) together at the lower groove or channel (28) and edge grooves or channels (36). The end pin (22) is shaped so as to fit within both grooves and connect the two pieces together.

Once the bottom panel (18) is attached to the back panel, the two side panels (14,16) can be positioned so as to line up the vertical grooves or channels (30) with the back panel edge grooves or channels (26), and also lining up the bottom panel edge grooves or channels (36) with the side panel lower grooves or channels (32). Once aligned, end pins (22) can be inserted to join the four pieces together. The end pins (22) are inserted from the top to join the back panel (12) to the side panels (14, 16), and from the front to join the side panels (14, 16) to the bottom panel (18).

To complete the piece of the modular cabinet, a front face frame (20) is attached using the hidden grooves or channels (34) on the side panels (14, 16). With the hidden grooves or channels (34), a hidden pin (24) is employed to join the pieces. The hidden groove or channel (34) is cut differently from the other grooves or channels, in that with a hidden groove or channel (34) the groove or channel does not extend the entire length or width of the panel or edge. The hidden groove or channel (34) is cut so that there is a bulbous cylindrical groove with a rectangular neck over a portion of the length, and then an area where there is no neck portion. This allows a hidden pin to be placed into the wood and moved into the bulbous cylindrical groove section. A corresponding cut for a hidden pin is made on the inner side (42) of the front face frame (20), albeit, cut in an opposing direction so that the hidden pin is secured when the face frame (20) is positioned along the side panels (14, 16) and moved downward.

FIGS. 2A-E shows an alternate method for assembling a modular cabinet. The back panel (12) is attached to side panel (16), lining up the back panel edge groove or channel (26) with the side panel vertical groove (30) and securing the two with end pins inserted into the two grooves. Then the other side panel (14) is attached to the back panel (12) in the same manner. The bottom panel (18) can then be positioned, lining up the edge grooves (36) with the side panel lower grooves (32) and secured with end pins. The front face frame (20) can then be attached by lining it up in an offset position (FIG. 2D), so that the hidden grooves (34) can line up with corresponding hidden grooves on the face frame (20). This allows the hidden pins to engage with both sets of hidden grooves, and as the face frame (20) is then moved into position (FIG. 2E), the hidden pins secure the frame (20) to the side panels (14, 16).

FIGS. 3A-B show how the front face frame (20) can be formed, with or without a center panel (60). The frame (20) is formed from two opposing side panels joined to a top panel and a bottom panel secured together with hidden pins (24). FIG. 3A shows the frame (20) without a center panel. In this embodiment, hidden grooves (70) are cut into the side panels to correspond with hidden grooves (72) cut into the top and bottom panels (66, 68). FIG. 3B shows the frame (20) with a center panel (60). In an embodiment with a center panel (60), a lengthwise groove (82) is cut to correspond to the hidden grooves (84) in the top and bottom panels (78, 80). The lengthwise grooves (82), on each of the opposing side panels (74, 76) are designed to allow the center panel to recess slightly within the groove (82). Similar grooves are cut into the top and bottom panels (78, 80) to allow the center panel to recess within the top and bottom panels (78, 80). As an alternative to joining the panels with hidden pins, the top and bottom panels can be secured to the opposing side panels with an adhesive. FIG. 4 shows the inner surface of the opposing side panels of the front face frame. A pair of hidden grooves (86) are located to allow hidden pins to secure the frame to the cabinet side panels.

FIGS. 5-8 show more detailed views of the panels making up one embodiment of the modular cabinet utilizing hidden pins for connections. The side panel (17) has a vertical groove (30) forming a substantially cylindrical channel. The vertical groove (30) is positioned within a recessed channel (31), so that when joining a back panel (12), the connection is hidden from view. Along the bottom of the side panel (17) there is a recessed channel (31) where the bottom panel (19) attaches. Two hidden grooves (34) are located within the recessed channel (31) so that a bottom panel (19) can attach with hidden pins. Two hidden grooves (34) are also located on the front edge of the side panel (17) to allow a front face frame to attach. The back panel (12) has a recessed channel (31) to allow the bottom panel to recess slightly within the back panel (12) for a more secure attachment. The bottom panel (12) has edge grooves (36) running along the edge forming cylindrical channels to allow for a secure attachment to the side panels.

FIGS. 9A-9G show the end pin (22) design. As depicted, there are two substantially cylindrical members (44) connected together by a substantially flat portion (46). Each cylindrical member (44) has one end (48) with hemispherical shape and a second end (50) that is flat. In a preferred embodiment of the end pin (22), the flat end (50) has a slight flare, so that the diameter at the flat end (50) is slightly larger than the rest of the body of the cylindrical member (44). The hemispherical end (48) allows the end pin (22) to be more easily inserted into the groove or channel cut into the pieces of the modular cabinet (10). The hemispherical shape of the end (48) is the preferred design; however, any shape creating a taper will achieve the desired function of allowing the end pin (22) to be more easily inserted into the groove or channel. The flare on the other end (50) helps secure the pin (22) in a groove or channel once inserted.

FIGS. 10A-10F show the hidden pin (24) design. As depicted, there are two substantially cylindrical body members (52) joined together with a substantially flat portion (54). In the hidden pin (24) design, each end (56) of the cylindrical members is a hemisphere. Also, of note is that depicted here there is an offset between the two cylindrical members (52). The purpose behind the having a hemispherical end on each end of the cylindrical members (52) is that when a hidden pin (24) is used, opposite ends of each cylindrical member need a tapered end because the panels that will be joined by a hidden pin (24) will need to move in opposite directions to secure the hidden pin (24) into place. Again, however, while the hemispherical design is the preferred embodiment, any taper will allow the hidden pin to function as desired.

Figure 12A:
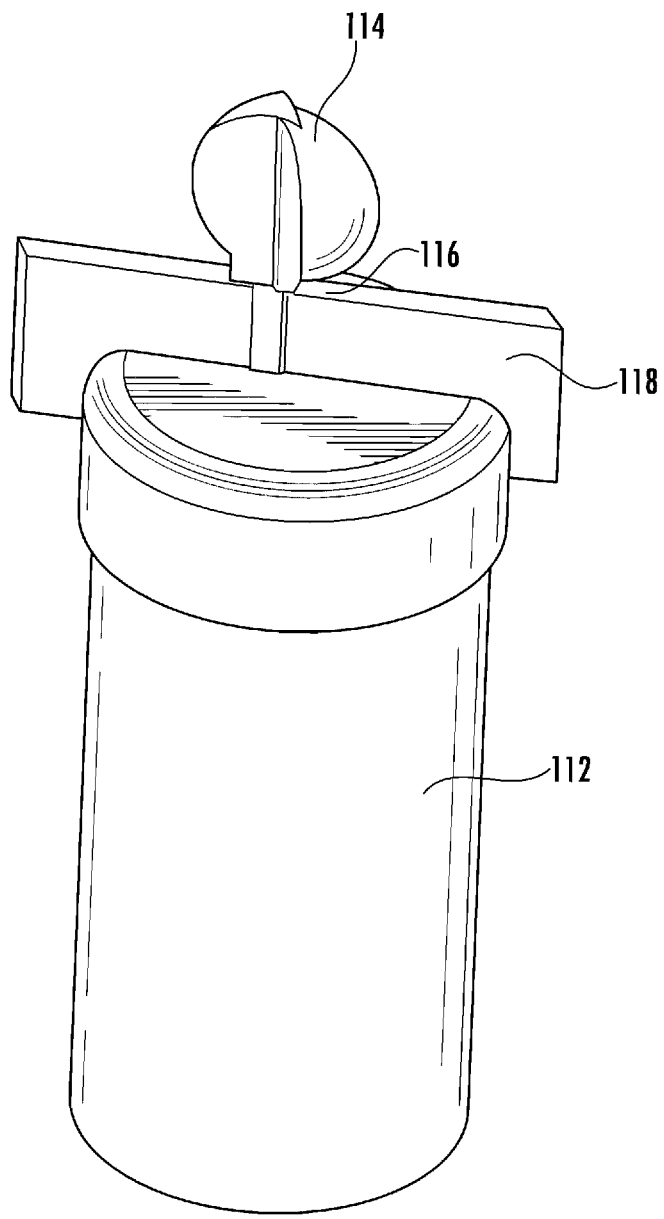
FIG. 12A shows a perspective view of a dado ball bit.
Figure 12B:
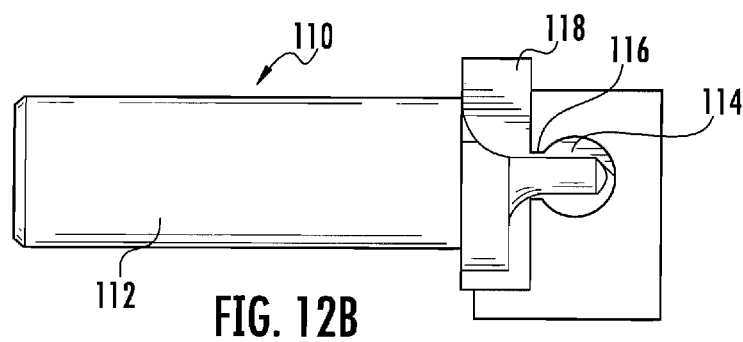
FIG. 12B is a side view of a dado ball bit.
Figure 12C:
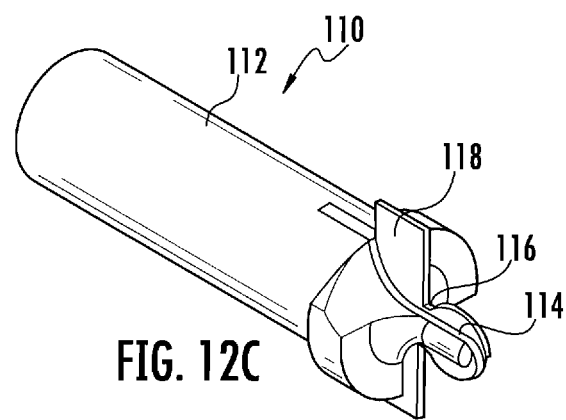
FIG. 12C is an alternate perspective view of a dado ball bit.

FIGS. 11A-11E show the ball bit (100) design. As shown, there is a substantially cylindrical body member (102) which engages with the tool which uses the ball bit (100) to cut a groove into one of the panels. On the first end (104) there is a circular cutting blade (106), joined to the cylindrical body member (102) by a rectangular cutting blade (108). The combination of the circular cutting blade (106) with the rectangular cutting blade (108) allows the circular cutting blade (106) to form a cylindrical channel on a panel, when cutting a groove for an attachment pin, which is displaced from the surface by the rectangular cutting blade (108). By allowing the cylindrical channel to be formed away from the surface of the panel, the portion of the groove that is nearest the surface has sufficient thickness to allow a pin to engage and provide enough strength to resist breaking FIGS. 12A-12C depict a dado ball bit (110). The dado ball bit main body (112) is a substantially cylindrical member to engage with the tool using the bit to cut a groove into a panel. The dado ball bit (112) includes a spherical tip (114), designed to cut a cylindrical channel into a panel which can be used to cooperate with a hidden pin or end pin to securely join two panels of a modular cabinet. Similar to the ball bit (100), shown in FIGS. 11A-11E, the dado ball bit (110) includes a rectangular cutting blade (116) connected to the spherical tip (114), so as to displace the cylindrical channel from the surface that is being cut and provide sufficient thickness to allow for secure engagement with an end pin or hidden pin. The dado ball bit (110), however, includes a second rectangular cutting blade (118). The second rectangular cutting blade (118) is designed to cut a rectangular channel into the surface of a panel that is the same thickness as the panels that form the modular cabinet. By cutting a channel with the second rectangular cutting blade (118), which the cylindrical channel cut by the spherical tip (114) displaced from the newly cut channel, when joining two panels one panel will recess slightly so that the corner connection will become hidden.

Figure 13A:
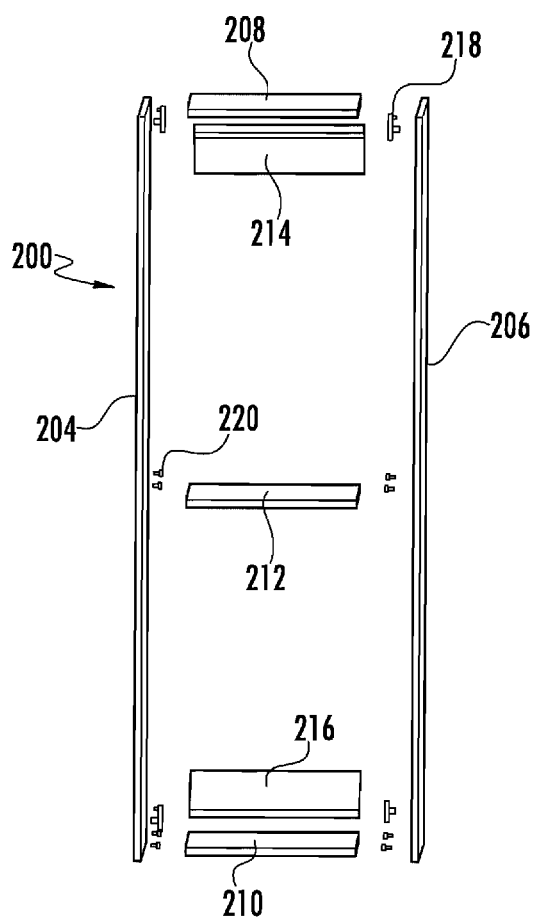
FIG. 13A is a front exploded view of a modular cabinet with threaded stud clamp assembly.
Figure 13B:
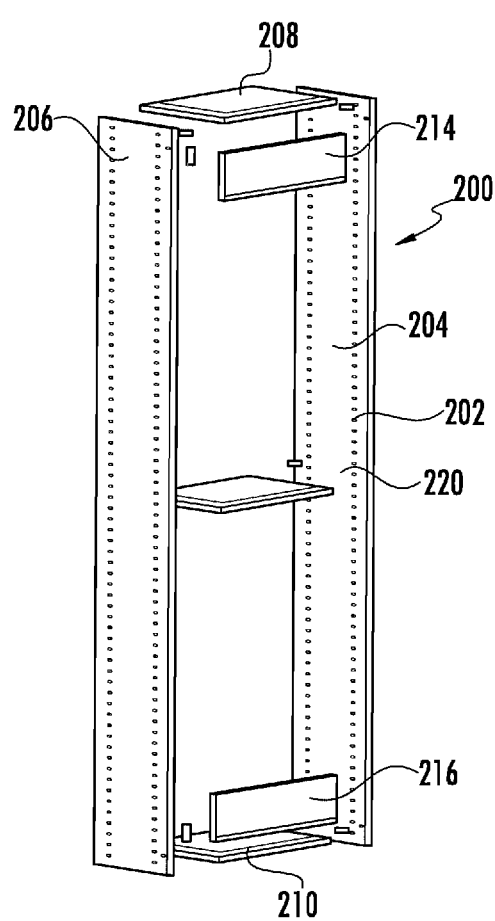
FIG. 13B is a rear perspective exploded view of a modular cabinet with threaded stud clamp assembly.

FIGS. 13A-23 show an alternate embodiment of the modular cabinet (200) incorporating a threaded stud clamp assembly. In this embodiment, shelf pin holes (202) are provided in two columns on the inner surface of each of the side panels (204,206) in the conventional construction used by bookshelf and shelving units in the prior art. FIGS. 13A and 13B show exploded views of the basic pieces of the modular cabinet (200). There is a left side panel (204), a right side panel (206), a top panel (208), a bottom panel (210), a central panel (212) which is more securely attached than ordinary shelving, and can include an upper back panel (214) and a lower back panel (216). The top and bottom panels (208,210) are secured to the side panels with hidden pins (218) or end pins, while the central panel is securely fixed by stud pins (220).

Figure 14:
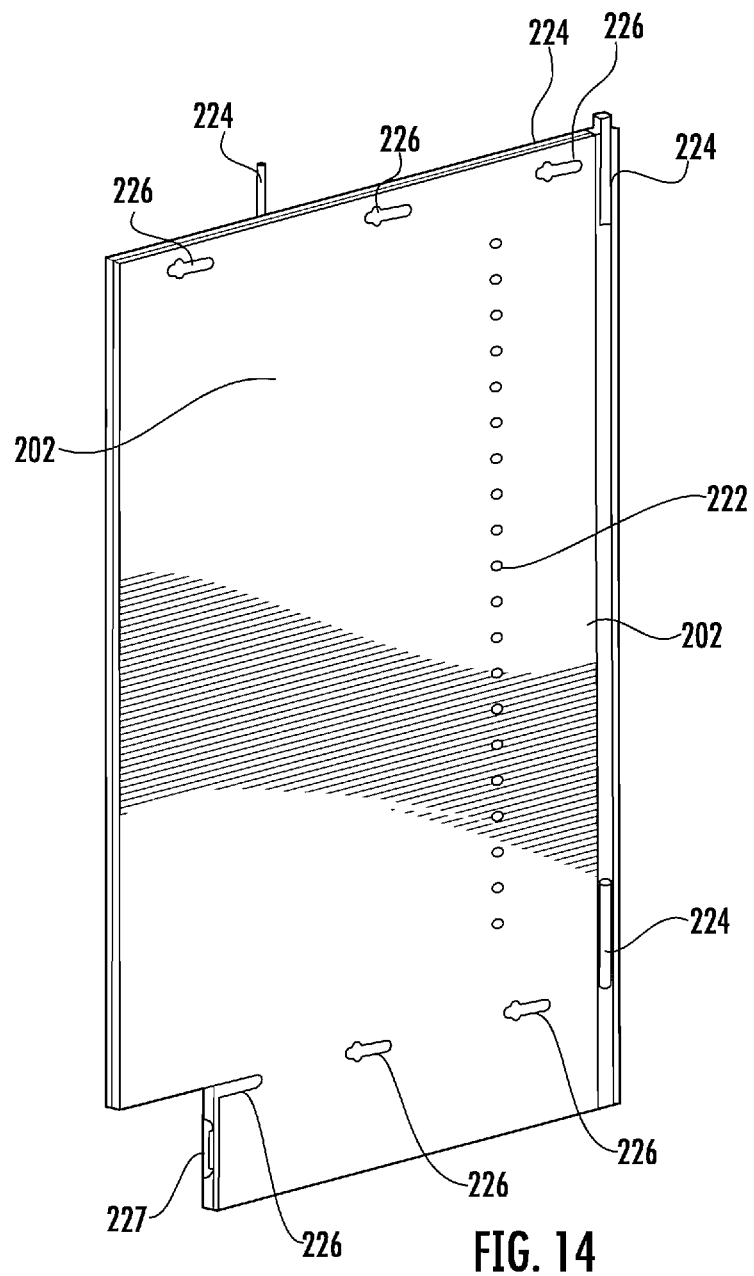
FIG. 14 is a perspective view of one embodiment of a side panel for a modular cabinet with hidden clamping system.
Figure 23:
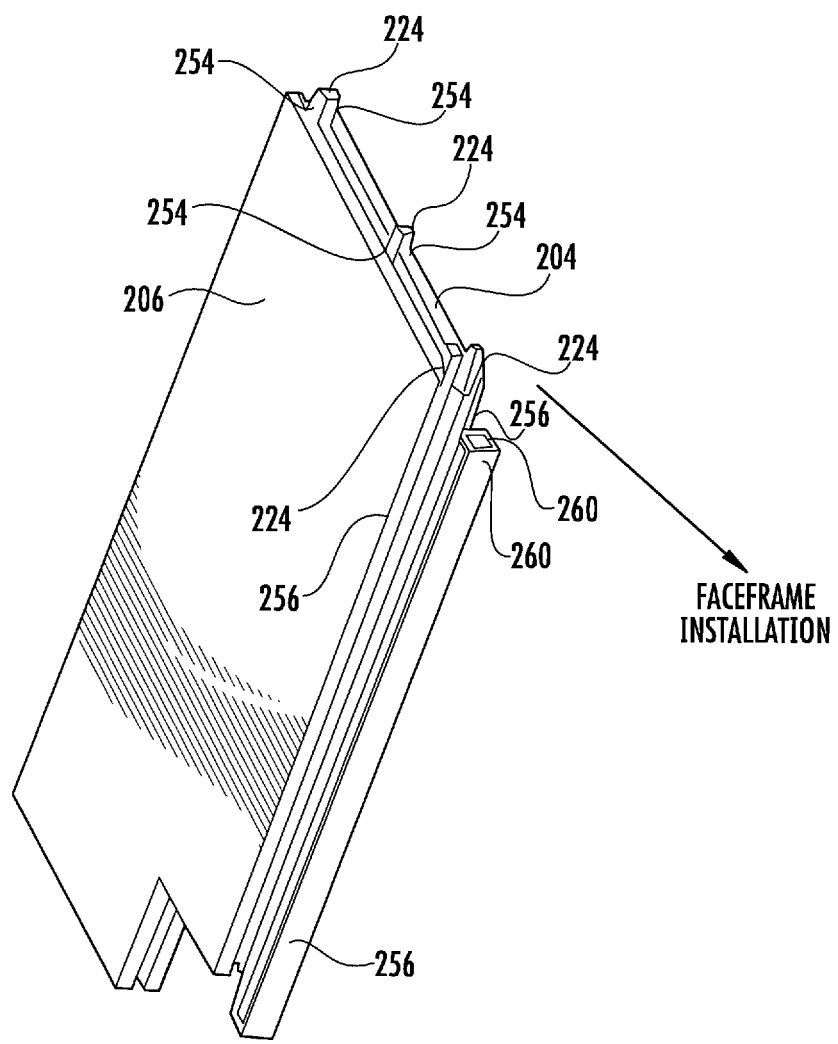
FIG. 23 is a perspective view of two adjacent panels being ganged together.
Figure 27A:
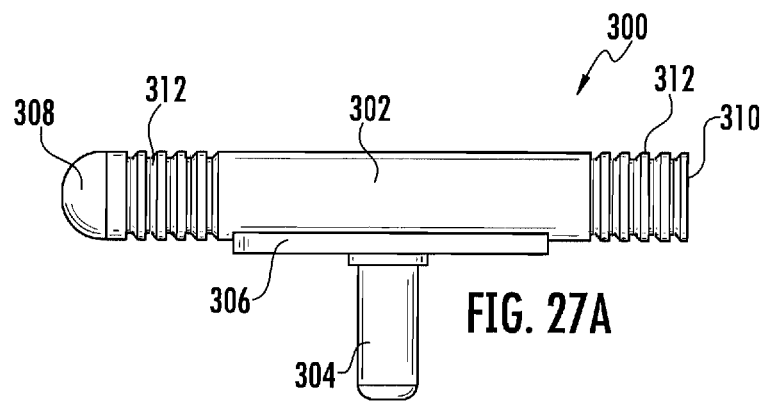
FIG. 27A is first side view of a stud pin.
Figure 27B:
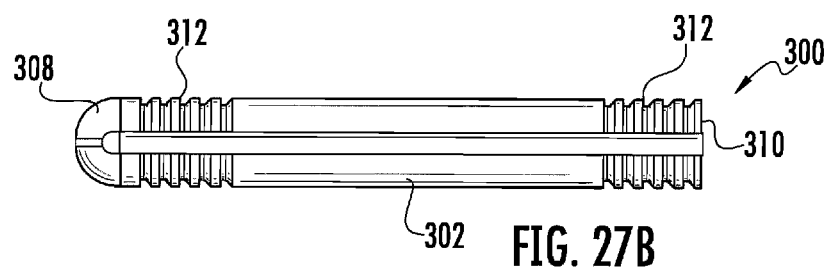
FIG. 27B is a top view of a stud pin.
Figure 27C:
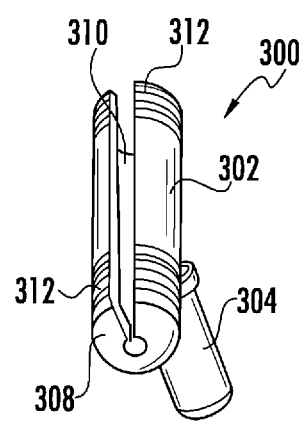
FIG. 27C is a first end perspective view of a stud pin.
Figure 27D:
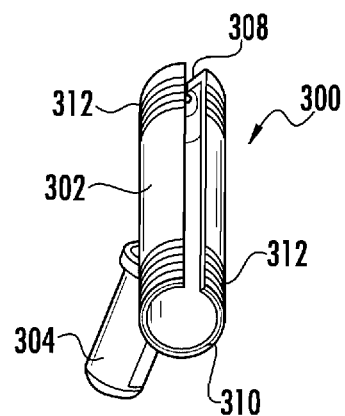
FIG. 27D is a second end perspective view of a stud pin.
Figure 28A:
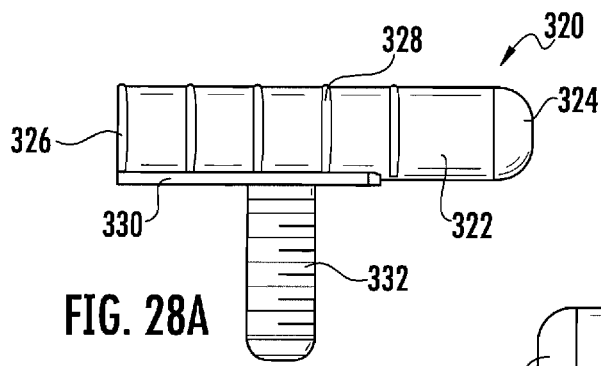
FIG. 28A is a first side view of a threaded stud pin.
Figure 28B:
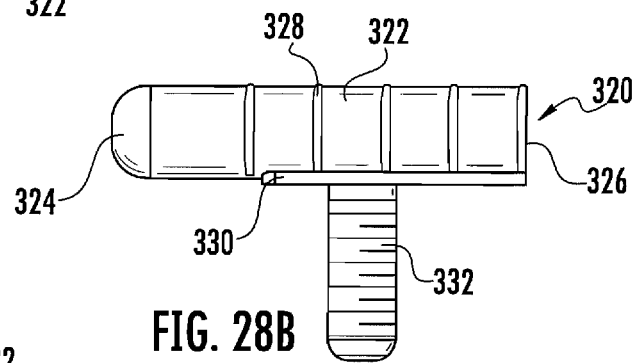
FIG. 28B is a second side view of a threaded stud pin.
Figure 28C:
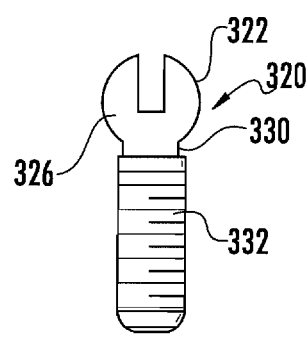
FIG. 28C is a rear end view of a threaded stud pin.
Figure 28D:
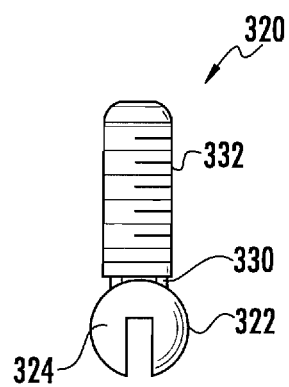
FIG. 28D is a front end view of a threaded stud pin.
Figure 28E:
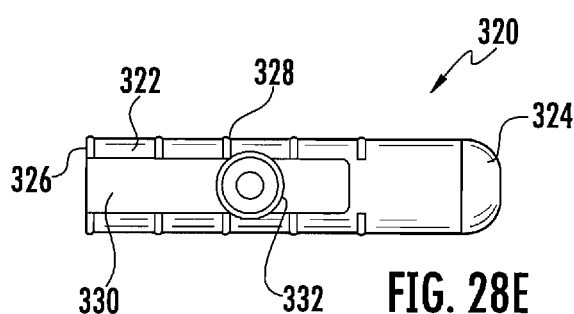
FIG. 28E is a bottom view of a threaded stud pin.
Figure 28F:
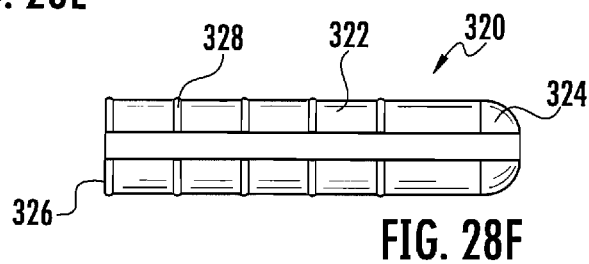
FIG. 28F is a top view of a threaded stud pin.

FIGS. 14-18 show alternate embodiments of side panel construction based on the desired finished look of the cabinet. For illustrative purposes, FIGS. 14-18 show a left side panel, but the right side panel for each design will be the mirror image panel. In FIG. 14, the panel shown with a vertical lengthwise groove (222) along the back of the panel. This allows a back panel to be positioned with a corresponding groove lined up with groove (222) and secured with end pins (224) attached at least at the top and bottom. Along the top of the panel are a series of hidden pin grooves (226) so that a top panel can be connected by hidden pins. A series of hidden pin grooves (226) also runs along the lower portion of the panel so that the bottom panel can attach by hidden pins. There is also a hidden pin groove (227) on the front edge at the bottom of the panel. This allows a spreader panel to be positioned at the base of the cabinet (200). Two columns of shelf pin holes (202) run vertically for the length between the top panel and the bottom panel. Also shown are two end pins (224) coming down from the top on the outer surface of the panel. These are used for ganging two adjacent cabinets, as shown in FIG. 23.

Figure 15A:
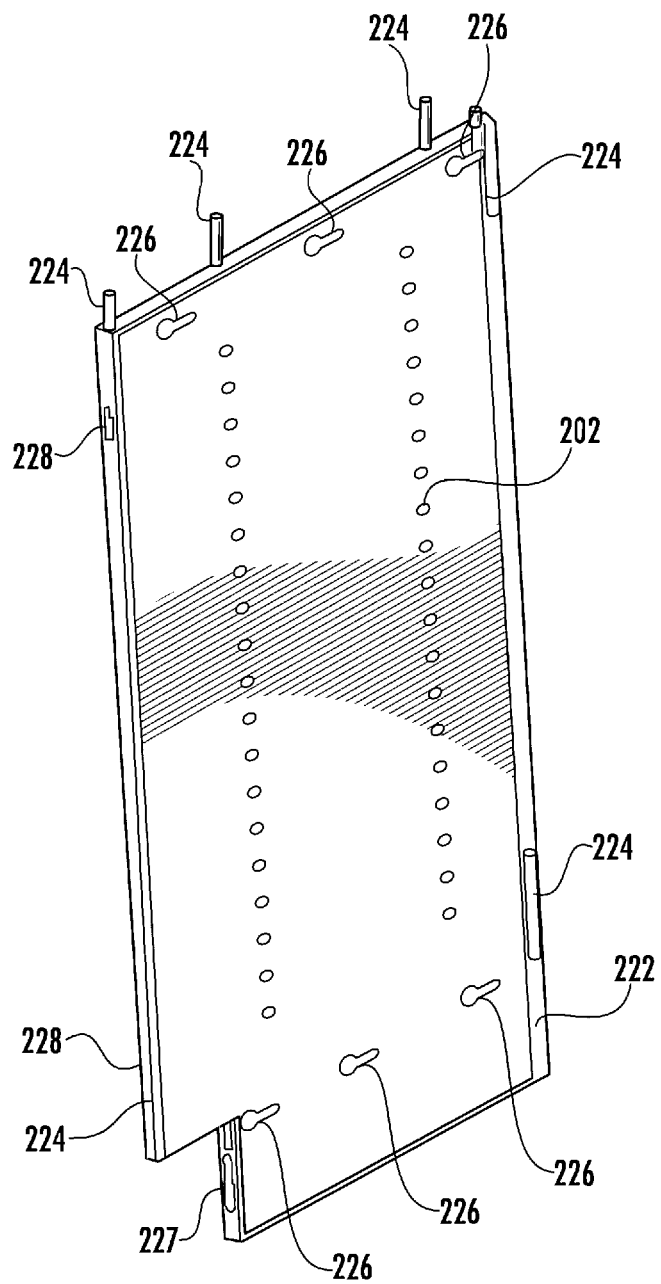
FIG. 15A is a perspective view of an alternate embodiment of a side pane for a modular cabinet with hidden clamping system incorporating a front face frame.
Figure 15B:
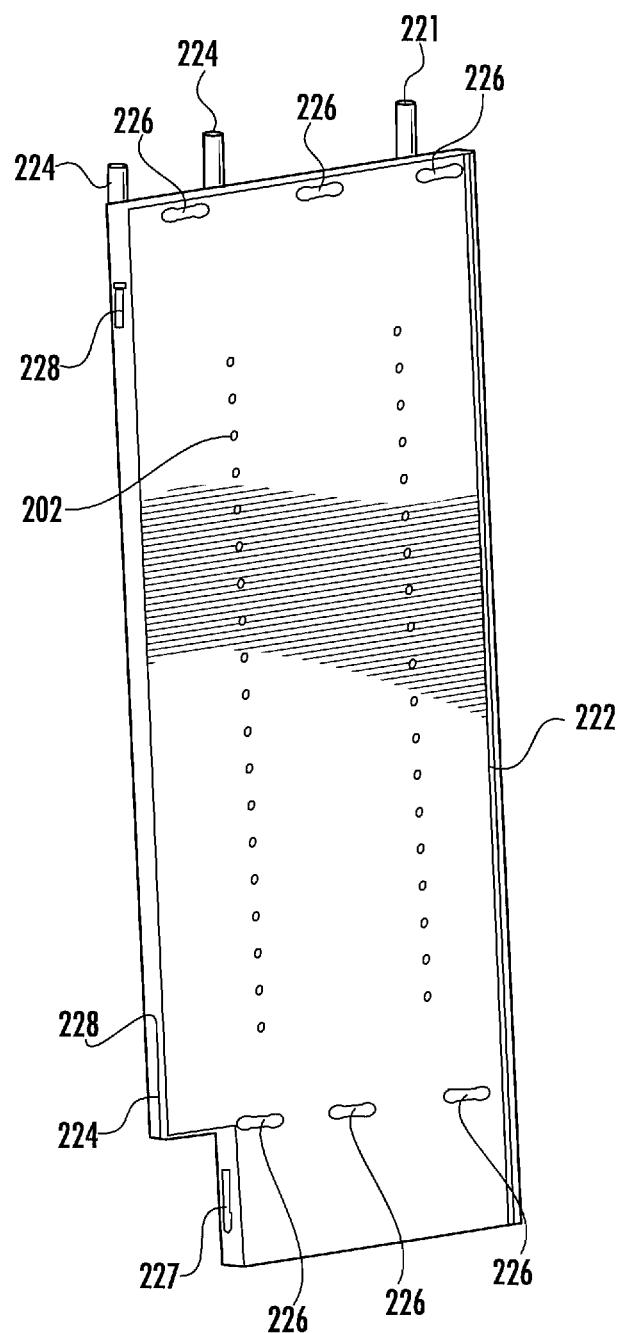
FIG. 15B is a perspective view of an alternate size of FIG. 15A.
Figure 16:
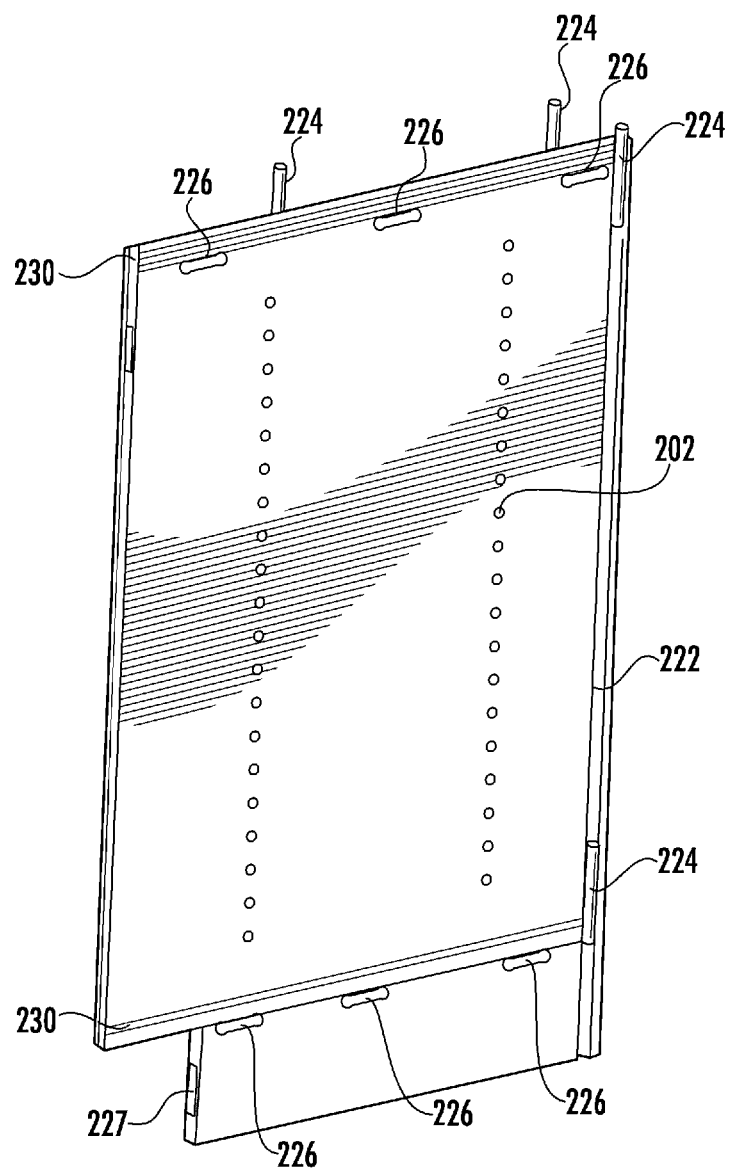
FIG. 16 is a perspective view of an alternate embodiment of a side panel for a modular cabinet with hidden clamping assembly for use without a frame.
Figure 17:
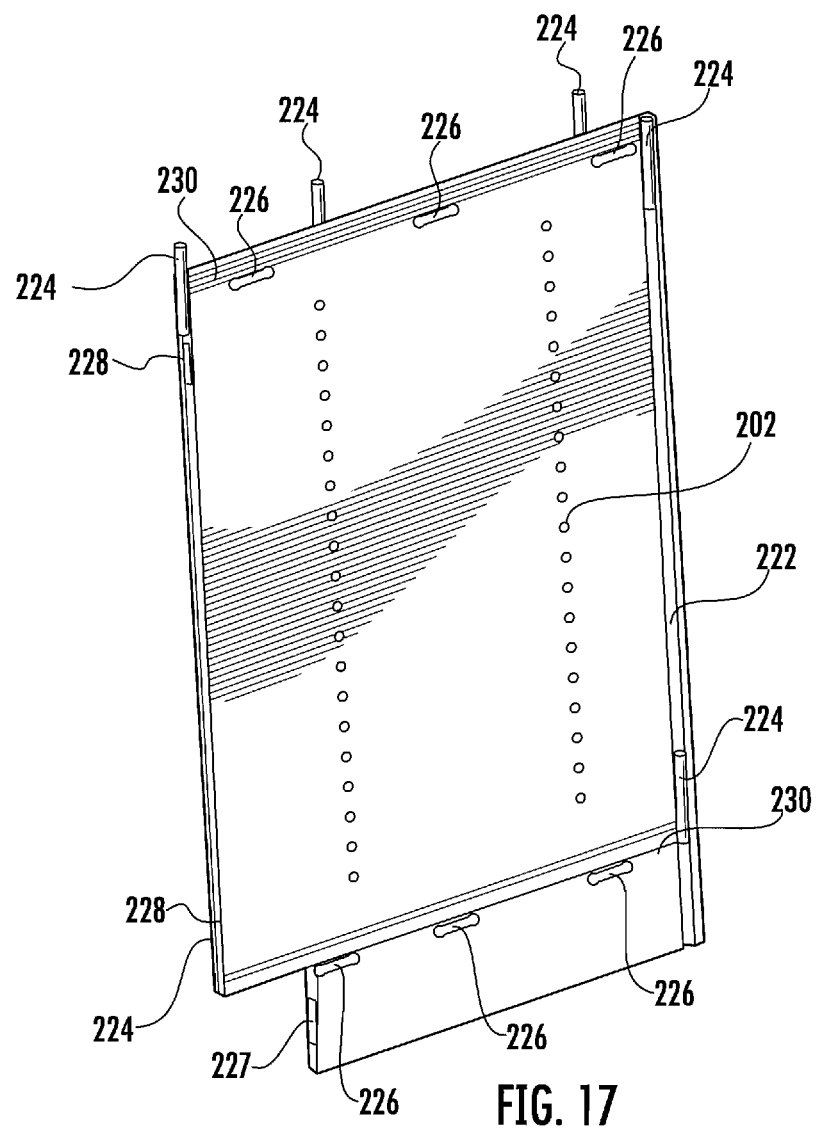
FIG. 17 is a perspective view of an alternate embodiment of the side panel of FIG. 16, for use with a front face frame.
Figure 18:
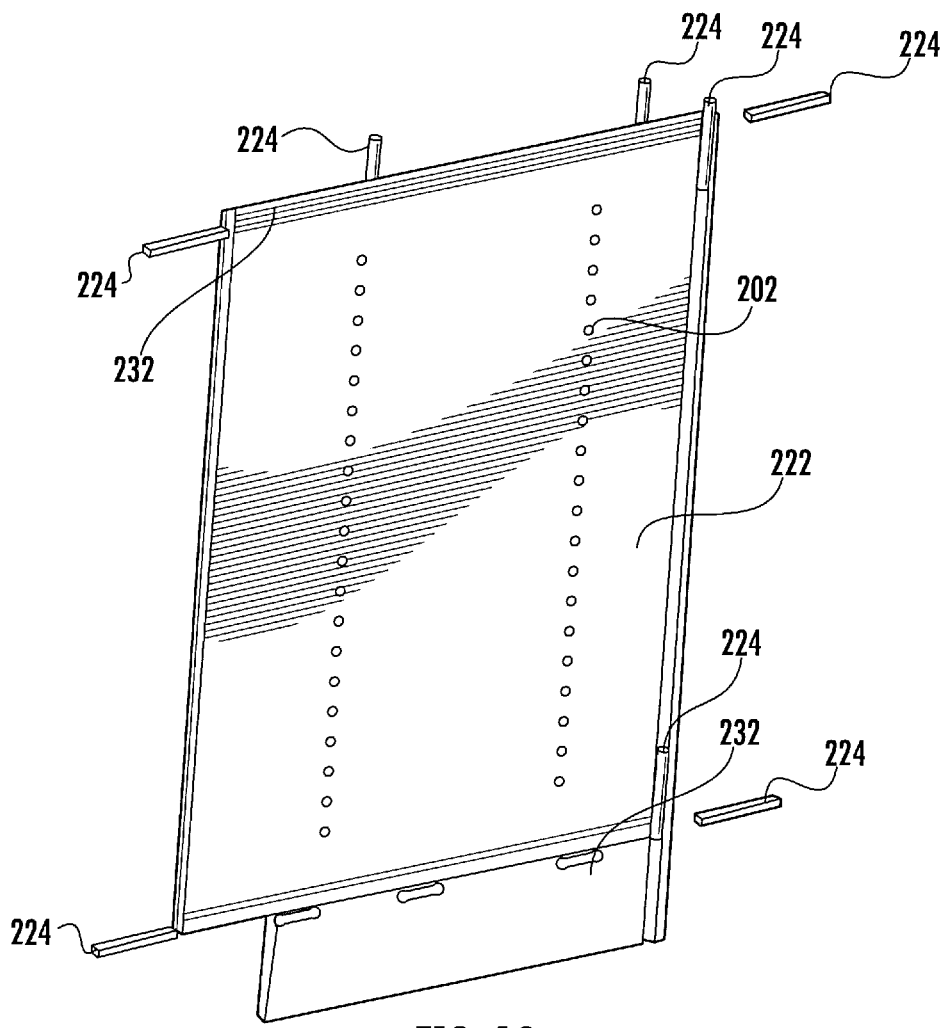
FIG. 18 is a perspective view of an alternate embodiment of a side panel for a modular cabinet with hidden clamping system.

FIGS. 15A and 15B also include front grooves (228) so that a front face frame can be attached by end pins (224). FIGS. 16 and 17 include an additional channel (230) above where the top panel and the bottom panel would attach. The embodiment in FIG. 18 includes a dado channel (232) for the hidden connection of the top panel and bottom panel, instead of the hidden grooves in the previous panels.

FIG. 19 shows a lower back panel (216). There are edge grooves (234) to line up with the vertical lengthwise grooves of the side panels so that an end pin can securely connect them. There is also a channel (236) along the lower portion of the panel (216) so that the bottom panel can seat into the channel (236) when attached. The upper back panel (214), shown in FIG. 20, has edge grooves (238) to allow it to securely connect to the side panels. FIGS. 21A and 21B are alternate views of the spreader (240) used for tall cabinets. The spreader (240) has edge grooves (242) to allow for a secure connection using end pins.

Figure 22A:
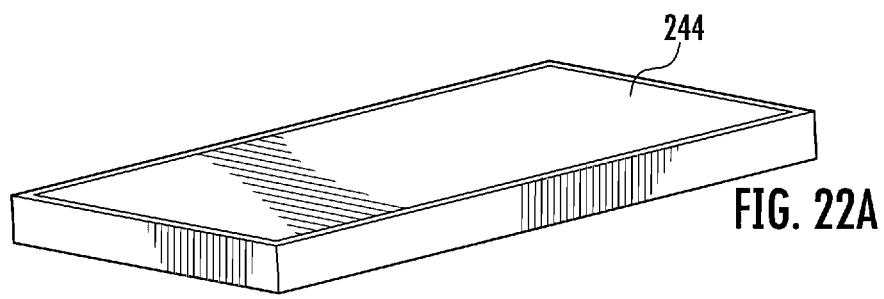
FIG. 22A is a perspective view of a floating shelf.
Figure 22B:
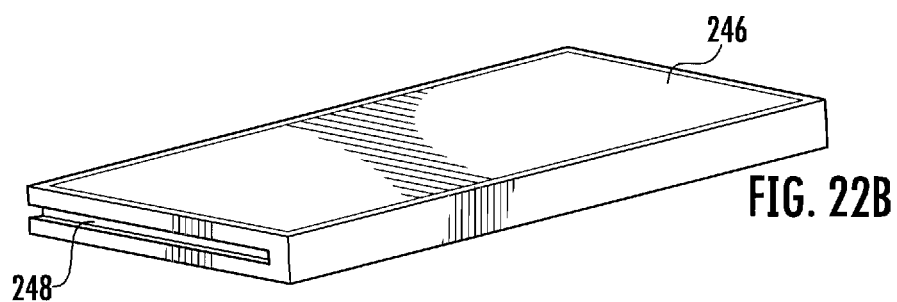
FIG. 22B. is a perspective view of a European style fixed shelf.
Figure 22C:
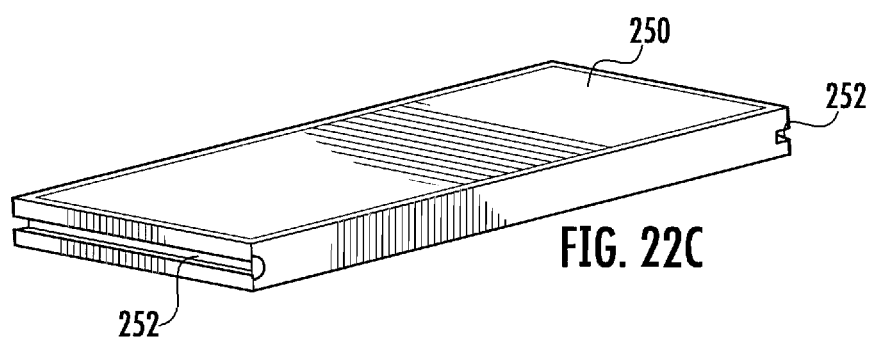
FIG. 22C is a perspective view of a fixed shelf to be used with a front face framed modular cabinet.

FIGS. 22A-C show different shelf types that can be attached to the cabinet using the shelf pin holes. FIG. 22A shows a basic floating shelf (244), which can rest on a basic single pin inserted partially into the shelf pin hole. FIG. 22B shows a fixed shelf (246) that is used when no front face frame will be used on the cabinet. This fixed shelf (246) has a partial edge groove (248) which runs most of the depth of the shelf, but opens only to the back. This shelf works with the stud pins to create a solidly fixed shelf that is not removable once the cabinet is assembled. The fixed shelf (250), shown in FIG. 22C, has an edge groove (252) which runs the full depth of the shelf and opens to the front and the back. This is designed to be used when a front face frame is employed to hide the edge groove opening. The stud pin is used here to securely fix the shelf in place during the assembly of the cabinet.

FIG. 23 shows the connections for ganging two adjacent cabinets securely together. A right side panel (206) on one cabinet will gang to the left side panel (204) of the adjacent cabinet. Each side panel (204,206) has a ganging groove (254) on the outer surface of the panel so that when each panel is lined up, an end pin (224) can be inserted into the two ganging grooves (254) to securely join the cabinets. Face frame grooves (256) can run the length of the front edge to that end pins (224) can secure a face frame (258) to the joined cabinets by securing to edge grooves (260) on the inner surface of the face frame (258).

FIG. 24A-D shows an alternate end pin embodiment (262). In this embodiment the two cylindrical body members (264) are offset slightly. There are also ridged regions (266) on the front and back ends of the body members (264). The pin (262) still has a hemispherical end (268) and a flat end (270). In this embodiment, the pin (262) is substantially hollow with a removed sector spanning the length of each body member (264). The removed sector allows for some compression of the pin (262), allowing for a better fit during the assembly of a modular cabinet.

Another alternate embodiment of the end pin (272) is provided in FIGS. 25A-F. In this embodiment, the pin (272) has an offset at hemispherical front end (274) but remains planar at the flat rear end (276). This is because there is a longer cylindrical body member (278) and a shorter cylindrical body member (280), still joined by a rectangular portion (282). In this embodiment, the entire length of each body member (278,280) contains ridges (284) for increased frictional contact when inserted into a groove. A rectangular portion is removed from each of the body members (278, 280) to allow for some compression of the pin (272) for a more secure assembly of the modular cabinet. The single pin (286), shown in FIGS. 26A-F, is the same as the individual cylindrical body members of end pin (272), shown in FIGS. 25A-F. There is a cylindrical body member (288), with a hemispherical end (290) and a flat end (292) and a series of ridges (294) spanning the length of the body (288). There is also a rectangular portion removed spanning the length, allowing for compression.

A stud pin (300) is shown in FIGS. 27A-D. The stud pin (300) is made from a cylindrical body member (302), similar to the other pin designs, but instead of a second cylindrical body member, here, there is a perpendicular pin (304) joined to the cylindrical body member (302) at a rectangular portion (306). The perpendicular pin (304) is sized to be received by standard shelf pin holes which are on the inner surface of a side panel of the cabinet. The cylindrical body member (302) has a hemispherical end (308) and a flat end (310), and ridges (312) to increase frictional contact. The cylindrical body member (302) is substantially hollow, with portion of the body (302) missing to allow for the body (302) to compress for a more secure fit.

FIGS. 28A-F show a threaded stud pin (320). There is a cylindrical body member (322) with a rectangular portion removed to allow for compression of the body (322). The body member has a hemispherical end (324) and a flat end (326) with ridges (328) therebetween. Along a portion of the body member (322) there is a rectangular surface (330) joining a perpendicular threaded pin (332) to the body (322). The perpendicular pin (332) is threaded to allow it to more tightly and securely screw into the shelf pin holes on the side panels. Then a fixed shelf can securely attach to the side panels.

Figure 29:
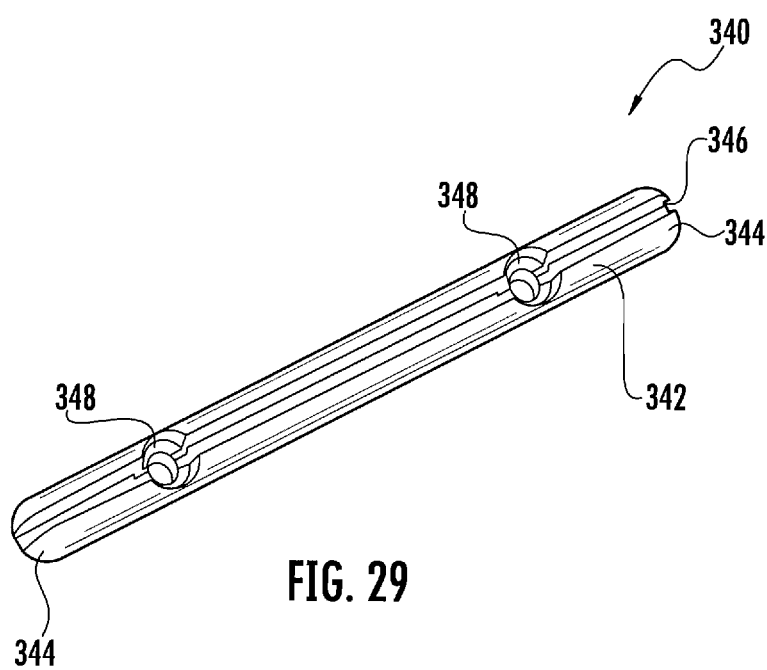
FIG. 29 is a top perspective view of a screw on clamp pin.
Figure 30A:
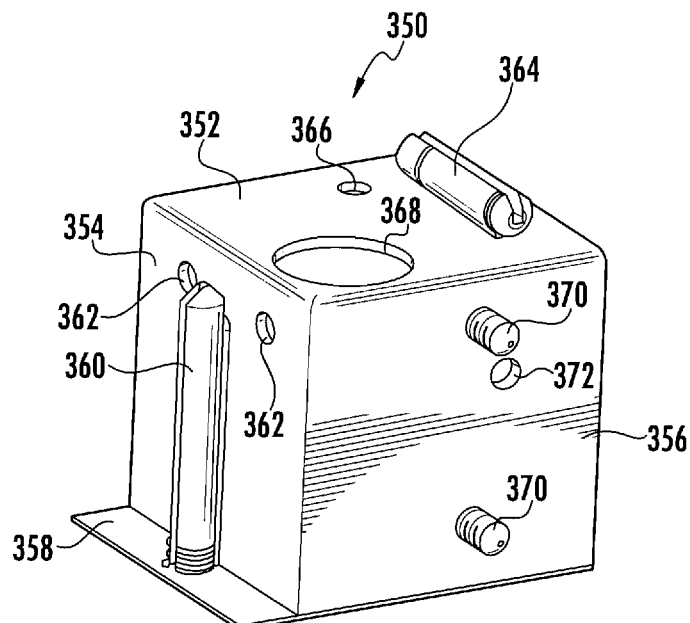
FIG. 30A is a front perspective view of a corner clamp.
Figure 30B:
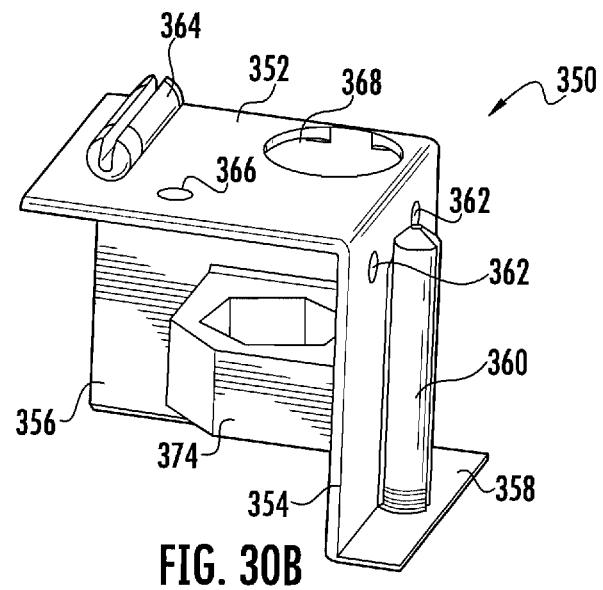
FIG. 30B is a side perspective view of a corner clamp.
Figure 30C:
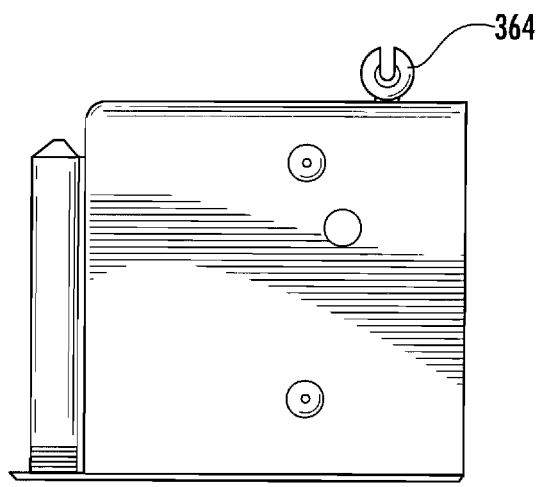
FIG. 30C is a side view of a corner clamp.
Figure 30D:
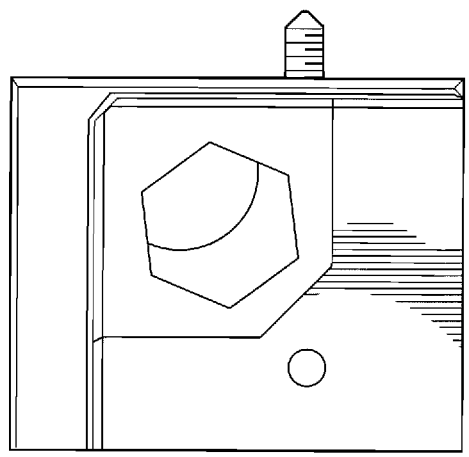
FIG. 30D is a bottom view of a corner clamp.
Figure 30E:
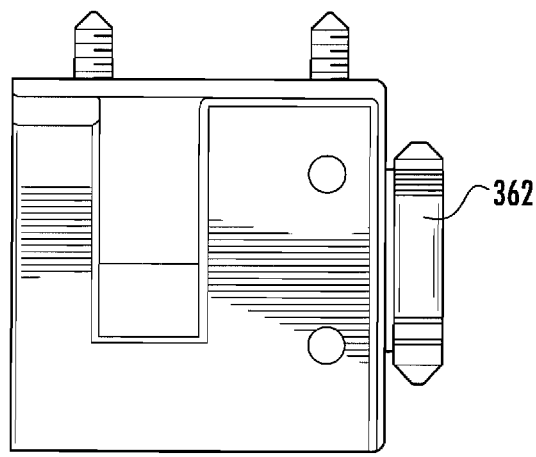
FIG. 30E is an alternate side view of a corner clamp.
Figure 31A:
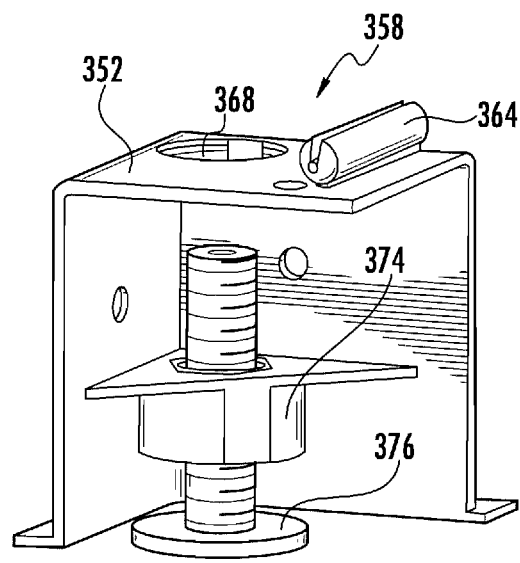
FIG. 31A is a perspective view of a corner clamp with optional leveling leg.
Figure 31B:
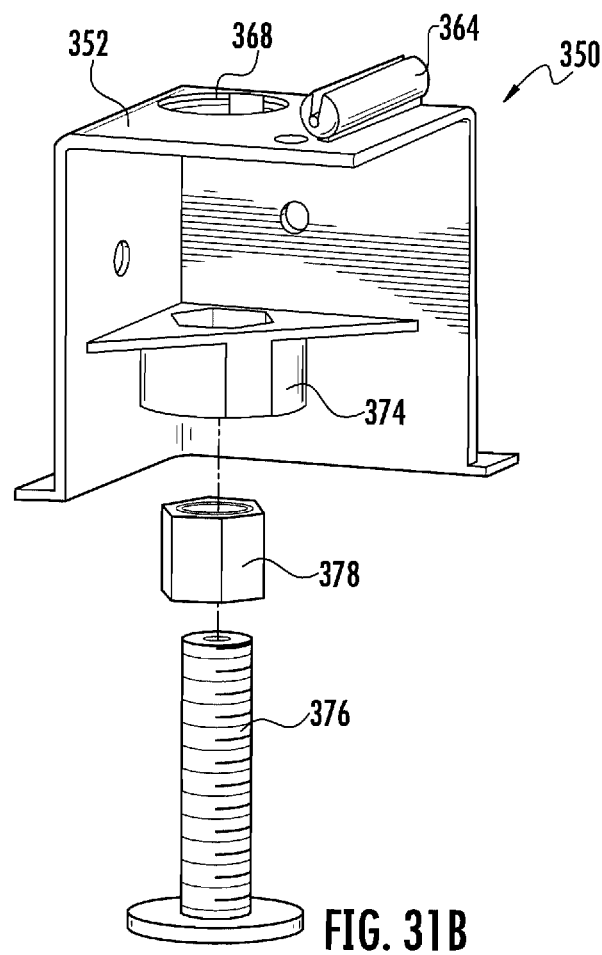
FIG. 31B is an exploded view of a corner clamp with optional leveling leg.
Figure 32:
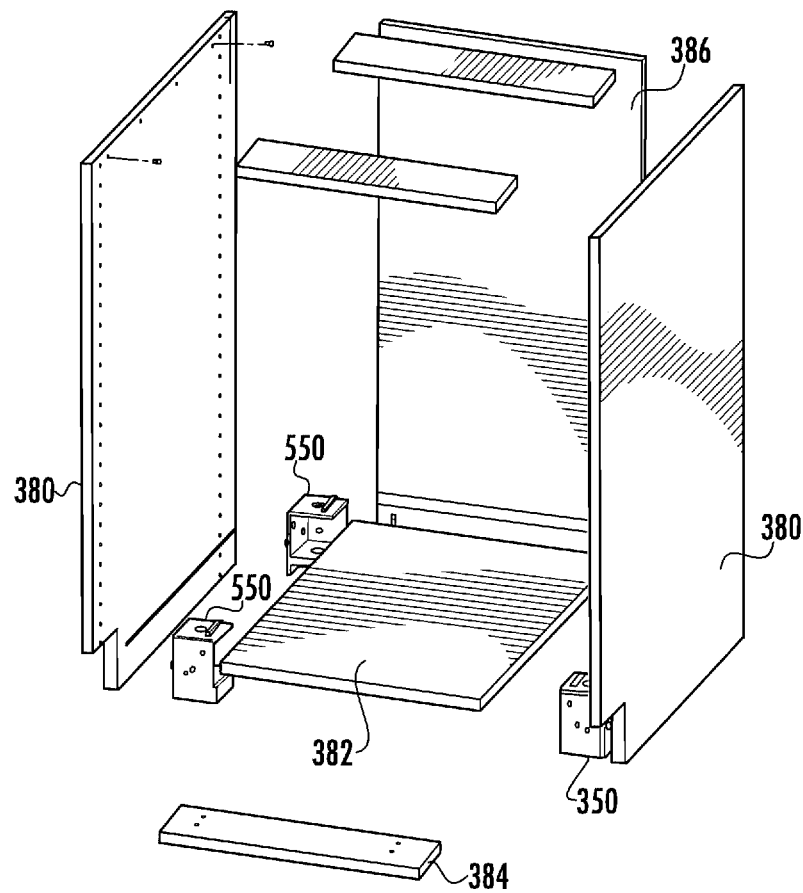
FIG. 32 is an exploded view of a cabinet with corner clamps.

FIG. 29 shows a screw clamp pin (340). The screw clamp pin (340) is used to quickly bond materials with a blind fastener without the need for advance manufacturing (i.e., no advanced drilling, sawing, or routing required). A screw clamp pin (340) can be mounted onto any surface in any orientation to create an attachment for a blind permanent connection. Mounted using only a screw driver, it is an inexpensive pin providing superior bonding strength, and can be disassembled if necessary. The screw clamp pin (340) has a substantially cylindrical body (342) with a pair of bull-nose leading caps (344) at each end of the body (342). Along the length of the pin (340) a compression slot (346) is employed to allow for some spring compression of the screw clamp pin (340) during operation. A pair of screw holes (348) are located along the compression slot (346), with the holes oriented through the screw clamp pin (340) and perpendicular to the compression slow (346). The screw holes (348) allow the pin (340) to be attached to any flat surface in any orientation, allowing two pieces of cabinetry to be attached with a blind, permanent connection. Because of the screw attachment, the screw clamp pin (340) can be attached onto a piece, without pre-machining, which can be especially useful if pre-machining is not possible.

FIGS. 30A-31B show a corner clamp (350) from various angles. A corner clamp (350) is made from three perpendicular surfaces (352,354,356), with a top surface (352) joined to a first side surface (354) and a second side surface (356). The first and second side surfaces (354,356) are joined along a vertical edge. On the bottom edge of each side surface is an edge guard (358), designed to prevent marring of the surface underneath the cabinet utilizing a corner clamp. The outer face of the first side surface (354) has a vertically disposed clamp (360) to attach a corner clamp (350) to a cabinet side piece (380), or a back cabinet piece (386). The outer face of the second side surface (386) has a pair of protruding studs (370), which allow for connection to a snap-on toe-kick piece (384) or to a cabinet side piece (380). Additionally, the first and second side surfaces (384, 386) have fastener holes (362,370). The top surface (352) has a horizontally disposed clamp (364) for quick connection to a cabinet bottom panel (382), as well as a fastener hole (366). The corner clamp (350) further includes a bracket (374) for an optional leveling leg (376) with nut (378). The leveling leg (376) can be accessed through an opening (368) on the top surface (352).

The corner clamp (350) allows for very rapid assembly of a cabinet, including the various blind permanent connections. It is inexpensive to manufacture, yet extremely rigid and strong. The protective non-marring edge guards (358) help protect chipping or marring of the floor on which a cabinet is installed.

Figure 33A:
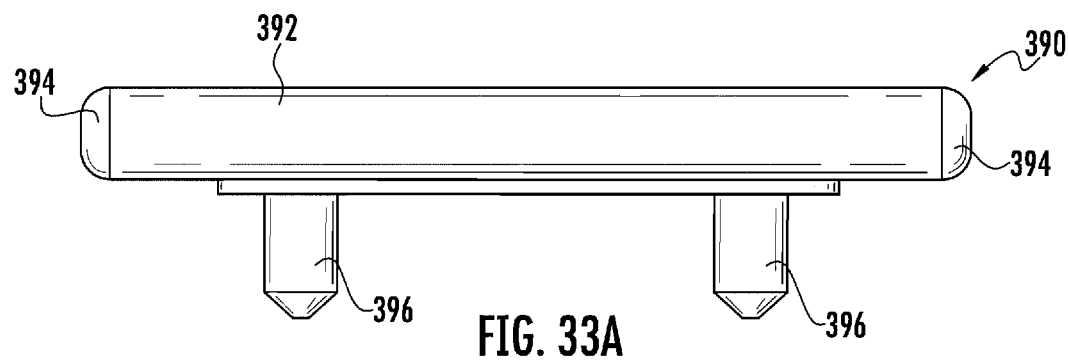
FIG. 33A is a side view of a field goal clamp.
Figure 33B:
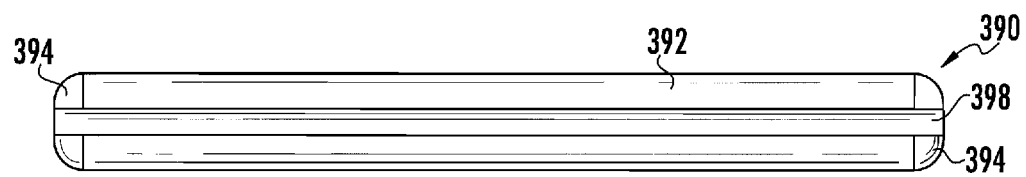
FIG. 33B is a top view of a field goal clamp.
Figure 33C:
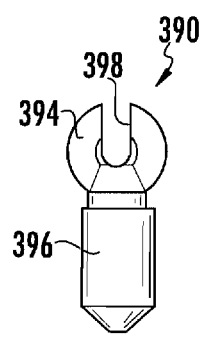
FIG. 33C is an end view of a field goal clamp.
Figure 34:
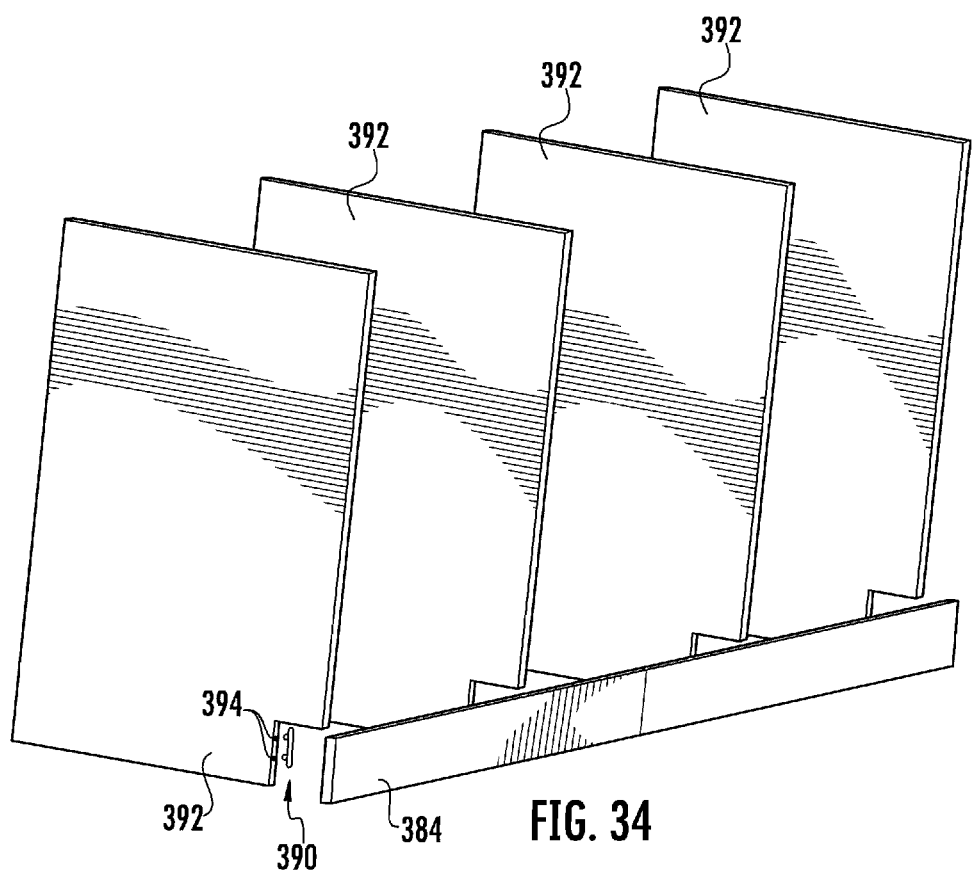
FIG. 34 is an exploded view of a cabinet and toe kick attached by a field goal clamp.

FIGS. 33A-34 show a field goal clamp (390) from alternate angles. The field goal clamp (390) provides the fastest connection insertion method to connect cabinet pieces. The main body (392) of the clamp is substantially cylindrical with opposing tapered ends (394). On the top portion of the body (392) is a compression slot (398) which runs the length of the body (392). On the bottom of the clamp are two protruding legs (396), which can be provided with ribbing for increased anchoring strength. During use, the main body (392) is inserted into a machined channel on a given panel, such as the toe kick show in FIG. 34. Then the legs (396) insert into machined holes (394) on the different side panels (392) for quick and easy attachment of the toe kick.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:
1. A fastener comprising:
  a body having a first surface opposing a parallel second surface along a vertical axis, a distal first face opposing a distal second face along a horizontal axis, said first and second faces perpendicular to said first and second surfaces, each of said first and second surfaces terminating integrally at a first end member and an opposing second end member of said body, said body having a first width and a first length;
  a center support section located between said first end member and said second end member;
  a first pair of inwardly compressible clips formed on said center support section, wherein one clip protrudes continuously away from said first surface and an opposing clip protrudes continuously away from said second surface resulting in a second width, wherein said second width is greater than said first width; and said body including at least one leg extending vertically away from said body, said at least one leg having a third width and a second length, wherein said third width is less than said second width: and wherein said at least one leg is a cylindrical protrusion extending perpendicular to a longitudinal direction of the body in an opposite direction from the pair of compressible clips.

2. The fastener of claim 1, further comprising an internal deflection space inside said center support section between said first pair of inwardly compressible clips, wherein said deflection space is bounded by a cantilever arm formed on a first side of said body and a second side of said body, each said cantilever arm anchored nearest a center of said body from which said arm projects outward from said body and from said deflection space and deflects into said deflection space when pressure is applied to said first pair of inwardly compressible clips.

3. The fastener of claim 1, wherein said first face comprises a first tapered edge located where said first face transitions to said first surface and a second tapered edge located where said first face transitions to said second surface of at least said second end member.

4. The fastener of claim 1, wherein said second length is less than said first length.

5. The fastener of claim 1 wherein said third width is greater than said first width.

6. A fastener comprising:

a body having a first surface opposing a parallel second surface along a vertical axis, a distal first face opposing a distal second face along a horizontal axis, said first and second faces perpendicular to said first and second surfaces, each of said first and second surfaces terminating integrally at a first end member and an opposing second end member of said body;

a center support section located between said first end member and said second end member, said center support section having a first width;

a first pair of attachment clips formed on said center support section, wherein one clip protrudes continuously away from said first surface and an opposing clip protrudes continuously away from said second surface resulting in a second width, wherein said second width is greater than said first width; and said body including at least one leg extending vertically away from said body, said at least one leg having a length less than a length of said body: and wherein said at least one leg is a cylindrical protrusion extending perpendicular to a longitudinal direction of the body in an opposite direction from the pair of attachment clips.

* * * * *